United States Patent
Sung et al.

(10) Patent No.: US 7,668,241 B2
(45) Date of Patent: Feb. 23, 2010

(54) APPARATUS AND METHOD FOR GENERATING 3D IMAGE SIGNAL USING SPACE-DIVISION METHOD

(75) Inventors: Jun-ho Sung, Seoul (KR); Sung-sik Kim, Seoul (KR); Jae-seok Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 995 days.

(21) Appl. No.: 10/910,809

(22) Filed: Aug. 4, 2004

(65) Prior Publication Data

US 2005/0057645 A1    Mar. 17, 2005

(30) Foreign Application Priority Data

Aug. 5, 2003    (KR)    ...................... 10-2003-0054217

(51) Int. Cl.
- H04B 1/66    (2006.01)
- H04N 7/12    (2006.01)
- H04N 11/02   (2006.01)
- H04N 11/04   (2006.01)

(52) U.S. Cl. ........................... 375/240.25; 375/240.18; 375/240.01; 359/462

(58) Field of Classification Search ............. 375/240.25
See application file for complete search history.

(56) References Cited

U.S. PATENT DOCUMENTS

| | | | | |
|---|---|---|---|---|
| 5,416,614 A | * | 5/1995 | Crawford | .................... 358/530 |
| 5,949,422 A | * | 9/1999 | Mochizuki et al. | .......... 345/420 |
| 6,108,047 A | * | 8/2000 | Chen | ........................... 348/581 |
| 6,556,193 B1 | * | 4/2003 | Auld et al. | ................... 345/418 |
| 6,690,427 B2 | * | 2/2004 | Swan | .......................... 348/448 |
| 2004/0218269 A1 | * | 11/2004 | Divelbiss et al. | ............ 359/464 |

FOREIGN PATENT DOCUMENTS

| JP | 9-65374 A | | 3/1997 |
|---|---|---|---|
| JP | 0065374 | * | 3/1997 |

\* cited by examiner

*Primary Examiner*—Marsha D Banks Harold
*Assistant Examiner*—Jessica Roberts
(74) *Attorney, Agent, or Firm*—Sughrue Mion, PLLC

(57) ABSTRACT

A 3-dimensional (3-D) image signal processing method and apparatus. The 3-D image signal processing apparatus converts a multi-visual-point 2-D image signal into a signal suited to a 3-dimensional image display apparatus. The 3-D image signal processing apparatus includes: a video decoder converting an analog image signal received from an image source arranged in an m*n space-division mode into a digital image signal; a 3-D image processing unit performing 3-D image processing of the digital image signal and generating an output signal suited to a 3-D image display apparatus; a memory storing the digital image signal; and a controller generating a memory-write-address and a memory-read-address of the memory and controlling write/read order of the digital image signal for scaling and vertical/horizontal multiplexing. According to the 3-D image signal processing apparatus of the present invention, a 3-D display interface apparatus capable of being applied to a plurality of multi-visual-point modes is realized.

36 Claims, 20 Drawing Sheets

<TYPE I>

<TYPE II>

APPARATUS AND METHOD FOR GENERATING 3D IMAGE SIGNAL USING SPACE-DIVISION METHOD

BACKGROUND OF THE INVENTION

This application claims the priority of Korean Patent Application No. 2003-54217, filed on Aug. 5, 2003, in the Korean Intellectual Property Office, the disclosure of which is incorporated herein in its entirety by reference.

1. Field of the Invention

The present invention relates to 3-dimensional (3-D) image processing, and more particularly, to an interface apparatus converting a multi-visual-point 2-dimensional (2-D) image signal into a signal suited to a 3-dimensional image display apparatus.

2. Description of the Related Art

Image display systems such as TVs have been developed to produce more realistic images. Accordingly, the image display systems require 3-D image media and image processing units corresponding to the 3-D image media. The field of 3-D image display apparatuses is divided into optical processing and image processing. Specifically, 3-D image processing has been developed by focusing on compression, restoration, transmission, and synthesizing of an image signal. Conventionally, a stereo (2-visual-point) type terminal, which is the simplest 3-D information terminal, is applied to the game industry and the medical industry, and 3-D broadcasting is currently realized using the stereo (2-visual-point) type terminal in Japan.

The field of an information terminal for the 3-D broadcasting is divided into image compression, multiplexing, storage, inverse multiplexing, image restoring, and image synthesizing, and interfacing with display apparatuses. Research of 3-D multi-visual-point images is advancing in various fields. However, obvious consensus for image compression and restoration has not been achieved, and only standards for the image compression and restoration are being developed. Accordingly, in order to develop a 3-D multi-visual-point information terminal, development of a field of manufacturing display apparatuses must proceed by continuously observing how the MPEG committee is progressing.

Therefore, unique development of a 3-D multi-visual-point image display apparatus not influenced by the tendency of image compression and restoration technology progression is required. Accordingly, a 3-D image interface apparatus reconstructing a multi-visual-point image signal into a signal suited to the 3-D image display apparatus is essential.

SUMMARY OF THE INVENTION

The present invention provides a multi-visual-point image interface apparatus reconstructing a multi-visual-point image signal into a signal suited to a 3-dimensional (3-D) image display apparatus used for realization of 3-D images, such as a realtime 3-D TV.

The present invention also provides an interface apparatus capable of being applied to a plurality of multi-visual-point modes without changing a hardware configuration.

According to an aspect of the present invention, there is provided a 3-D image signal processing apparatus comprising: a video decoder converting an analog image signal received from an image source arranged in an m*n space-division mode into a digital image signal; a 3-D image processing unit performing 3-D image processing of the digital image signal and generating an output signal suited to a 3-D image display apparatus; a memory storing the digital image signal; and a controller generating a memory-write-address and a memory-read-address of the memory and controlling write/read order of the digital image signal for scaling and vertical/horizontal multiplexing.

The 3-D image processing unit may comprise: a scan converter de-interlacing the digital image signal from the video decoder from an interlaced scanning signal to a progressive scanning signal; a vertical scaler scaling the signal converted to the progressive scanning signal in the vertical direction by a predetermined multiple; a vertical multiplexer multiplexing the scaled digital image signal in a row direction; and a horizontal multiplexer multiplexing the scaled digital image signal in a column direction.

The 3-D image processing unit may further comprise a space division mode converter making it possible to perform digital image signal processing of image signals in seven other space-division modes with a hardware configuration of a 4*4 space-division mode.

In an 8*1 or 8*2 mode, the video decoder may input image signals received from image sources not in a 4*4 arrangement corresponding to image signals received from image sources in the 4*4 arrangement, and the space-division mode converter may comprise an 8_X space-division mode converter, which makes it possible to perform scaling, vertical multiplexing, and horizontal multiplexing of the input image signals in the 8*1 mode or 8*2 mode like in the 4*4 mode.

The 8_X space division mode converter may comprise a data selector selecting the image signals received from the image sources not in the 4*4 arrangement according to a user mode select signal and an 8_X select clock signal at every second clock pulse when the image signals are received from the image sources in the 4*4 arrangement.

The space division mode converter further may comprise a signal router routing signals of input terminals in which signals input to the 3-D image processing unit exist to input terminals in which no signals input to the 3-D image processing unit exist when the number of image signals of the space-division mode is less than 16 in a case of a 8*1, 4*2, 4*1, 2*2, or 2*1 mode.

The 3-D image signal processing apparatus may further comprise a 2_X mode image signal distributor producing image signals received from image sources and outputting the produced signals to input terminals of the video decoders to which no image signals are input from the image sources exist when the space-division mode is a 2*1 or 2*2 mode.

According to another aspect of the present invention, there is provided a 3-D multi-visual-point image signal processing method comprising: video decoding an analog image signal from an image source in an m*n space-division mode into a digital image signal; and 3-D image processing of the digital image signal and generating an output signal suited to a 3-D image display method, wherein the 3-D image processing comprises: de-interlacing the digital image signal from an interlaced signal to a progressive scanning signal; vertically scaling the converted progressive scanning signal in the vertical direction by a predetermined multiple; vertically multiplexing the scaled digital image signal in the row direction; and horizontally multiplexing the scaled digital image signal in the column direction.

According to another aspect of the present invention, there is provided a computer-readable medium having recorded thereon HDL codes for realizing the 3-D multi-visual-point image signal processing method.

According to another aspect of the present invention, there is provided a field programmable gate array (FPGA) operating with HDL codes realizing the 3-D multi-visual-point image signal processing method.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which exemplary embodiments of the invention are shown. Like reference numbers are used to refer to like elements throughout the drawings.

First, a structure of generating multi-visual-point image signals using a space-division method and arrangement of the image signals input to an apparatus of the present invention using the structure will now be described with reference to FIG. 1 and FIG. 2.

Figure 1:
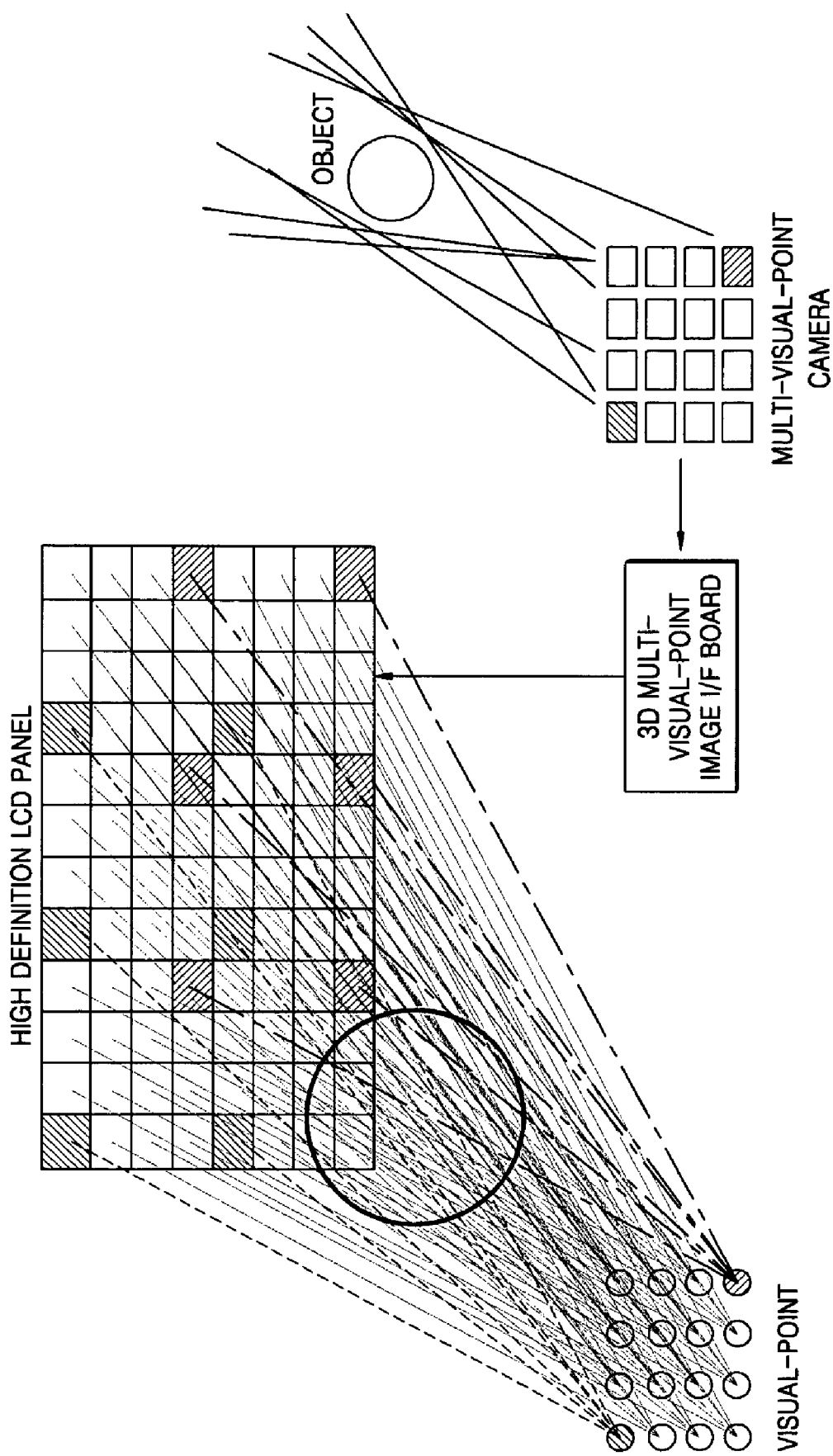
FIG. 1 illustrates a three dimensional (3-D) display system using a space-division method.

FIG. 1 illustrates a three dimensional (3-D) display system with a space-division method. Unlike a 3-D display apparatus using a stereo method that provides a viewer with only a sense of depth between objects in an image, a multi-visual-point 3-D display apparatus using a non-eyeglass method provides a viewer with a higher sense of reality to an image by adding a look-around function to the stereo method. To accomplish this, it is necessary to divide and spatially reorganize 2-D image information generated according to multiple visual-points into 3-D image information, and this 3-D image information reorganization technique is called a space-division method. That is, in the space-division method of image processing, the 3-D display apparatus converges predetermined 2-D image information into predetermined visual-points by rearranging various 2-D image information using optical processing.

FIG. 1 illustrates the reorganization of 16 pieces of image information photographed by a maximum of 16 cameras into 3-D image signals using an interface system, which is a 3-D image conversion apparatus. The 3-D image is displayed on a display apparatus, and 16 visual-points allowing a viewer to sense three dimensions are reorganized using a 3-D optical system. The image information photographed by 16 2-D cameras is converted into 3-D image signals suited to a 2-D image display apparatus by a multi-visual-point 3-D interface board. When the 3-D image signals are displayed, the 2-D image information of each visual-point of a camera converges to a predetermined visual-point using an optical lens. Since different 2-D images can be shown according to different positions of a viewer's eyes, the look-around function is achieved. Accordingly, the multi-visual-point 3-D display apparatus using the non-eyeglass method provides a viewer with a sense of three dimensions having a much higher sense of reality than the 3-D display apparatus using the stereo method.

Figure 2:
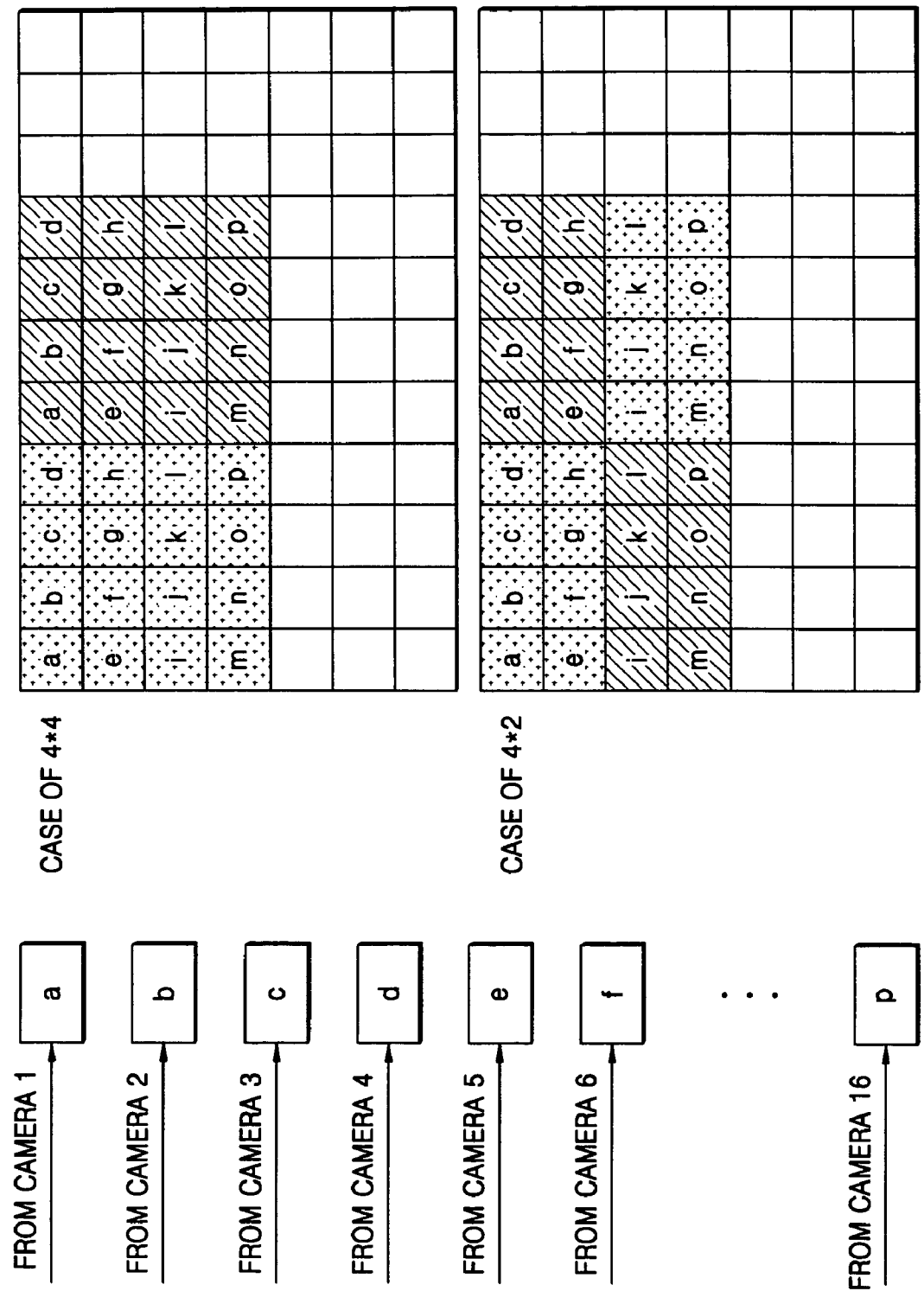
FIG. 2 illustrates a process of reorganizing 2-D image signals obtained by a 16 visual-point camera into 3-D image signals.

FIG. 2 illustrates a process of reorganizing 2-D image signals obtained by a maximum 16 visual-point camera into 3-D image signals. A configuration of horizontal arrangement:vertical arrangement=4:4 is represented by 4*4, and 16 2-D images are arranged in 4*4 blocks as shown in FIG. 2. A 3-D pixel including 16 pixels is called a macro pixel, and the macro pixel is, for example, a unit of an image that one cubic represents in a cubical display apparatus. For example, when a 1920*1200 resolution display apparatus is used, in a case of a 4*4 macro pixel, the number of macro pixels is 480*300, and in a case of 4*2 macro pixels, the number of macro pixels is 480*600. Since one cubic shows a picture by optically mixing 16 multi-visual-point images, a viewer watches different images according to a viewing angle. Accordingly, the look-around function is achieved.

Figure 3:
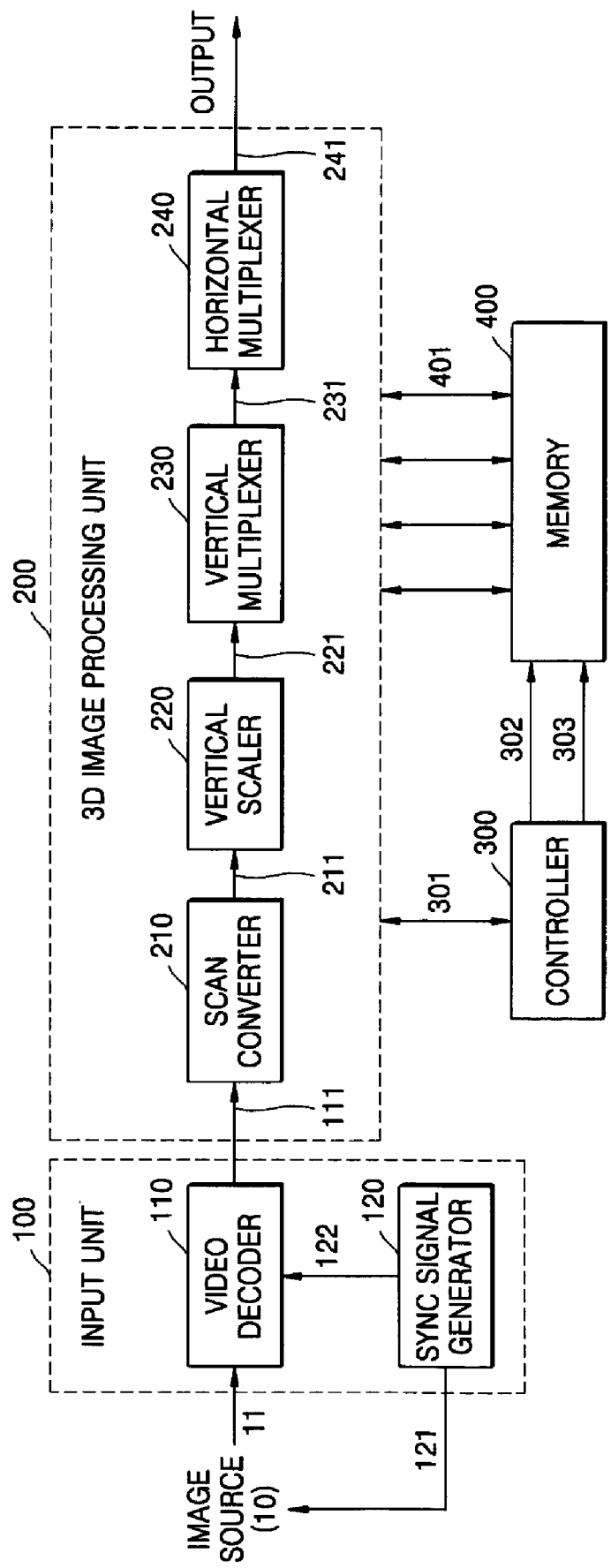
FIG. 3 is a block diagram of a 3-D image signal processing apparatus according to an exemplary embodiment of the present invention.

FIG. 3 is a block diagram of a 3-D image signal processing apparatus according to an exemplary embodiment of the present invention. Referring to FIG. 3, the 3-D image signal processing apparatus includes an input unit 100, which converts analog image signals 11 received from a plurality of image sources 10 into digital image signals 111 suited to digital signal processing, a 3-D image processing unit 200, which processes the digital image signals 111 received from the input unit 100 into signals suited to a display apparatus, a memory 400, which stores image data while the 3-D image processing unit 200 is processing the digital image signals 111 received from the input unit 100, and a controller 300, which controls inputs/outputs of the memory 400 and components included in the 3-D image processing unit 200.

Functions of the components of the 3-D image signal processing apparatus will now be described when input image signals photographed for 16 visual points of a 4*4 macro pixel are converted into 3-D image signals suited to a display apparatus with a 1920*1200 resolution.

The input unit 100 includes video decoders 110, which convert analog image signals 11 received from the plurality of image sources 10 into digital image signals 111, and a sync signal generator 120, which generates sync signals 121 and 122 that synchronize the operations of the video decoders 110 with the plurality of image sources 10.

The video decoders 110 generate digital image signals 111 by performing analog-to-digital conversion on the analog image signals 11, for example, NTSC (1Vp-p) format image signals, received from the plurality of image sources 10, each image source 10 being connected to each video decoder 110. Video decoder technology is widely known to those skilled in the art, and in a case where VPC 3230 of Micronas is used, specifications of output signals and sampling signals of a video decoder are shown below in Table 1 and Table 2, respectively. Here, a camera with a 480*240 resolution is used as the image source, a frequency of a data clock is 13.5 MHz, and a frequency of a sampling clock is 20.25 MHz. An output signal of the video decoder in the present embodiment is an YCrCb type 16-bit signal.

TABLE 1

| | | |
|---|---|---|
| Pixel_out/Line | 480 | [pixels] |
| Line_out/Field | 240 | [lines] |
| Double Clock Mode | 27000000 | [Hz] |
| Data Clock | 13500000 | [Hz] |
| Data Clock Cycle | 7.40741E−08 | [Hz] |
| Line Cycle | 6.34921E−05 | [sec] |
| Data Clock/Line | 857.1428571 | [pixels] |
| Active Data | 480 | [pixels] |
| Field Cycle | 0.016666667 | [sec] |
| Lines/Field | 262.5 | [lines] |
| Active Data | 240 | [lines] |

TABLE 2

| | | |
|---|---|---|
| Field/sec | 60 | [field/sec] |
| Field Cycle | 0.016666667 | [sec] |
| Lines/Field | 262.5 | [lines] |
| Line Cycle | 6.34921E−05 | [sec] |
| Sampling Clock Frequency | 20250000 | [Hz] |
| Sampling Clock Cycle | 4.93827E−08 | [sec] |
| Total Pixel/Line | 1285.714286 | [pixels] |
| Active Video | 0.0000526 | [sec] |
| Active Pixel/Line max. | 1065.15 | [pixels] |

Figure 4A:
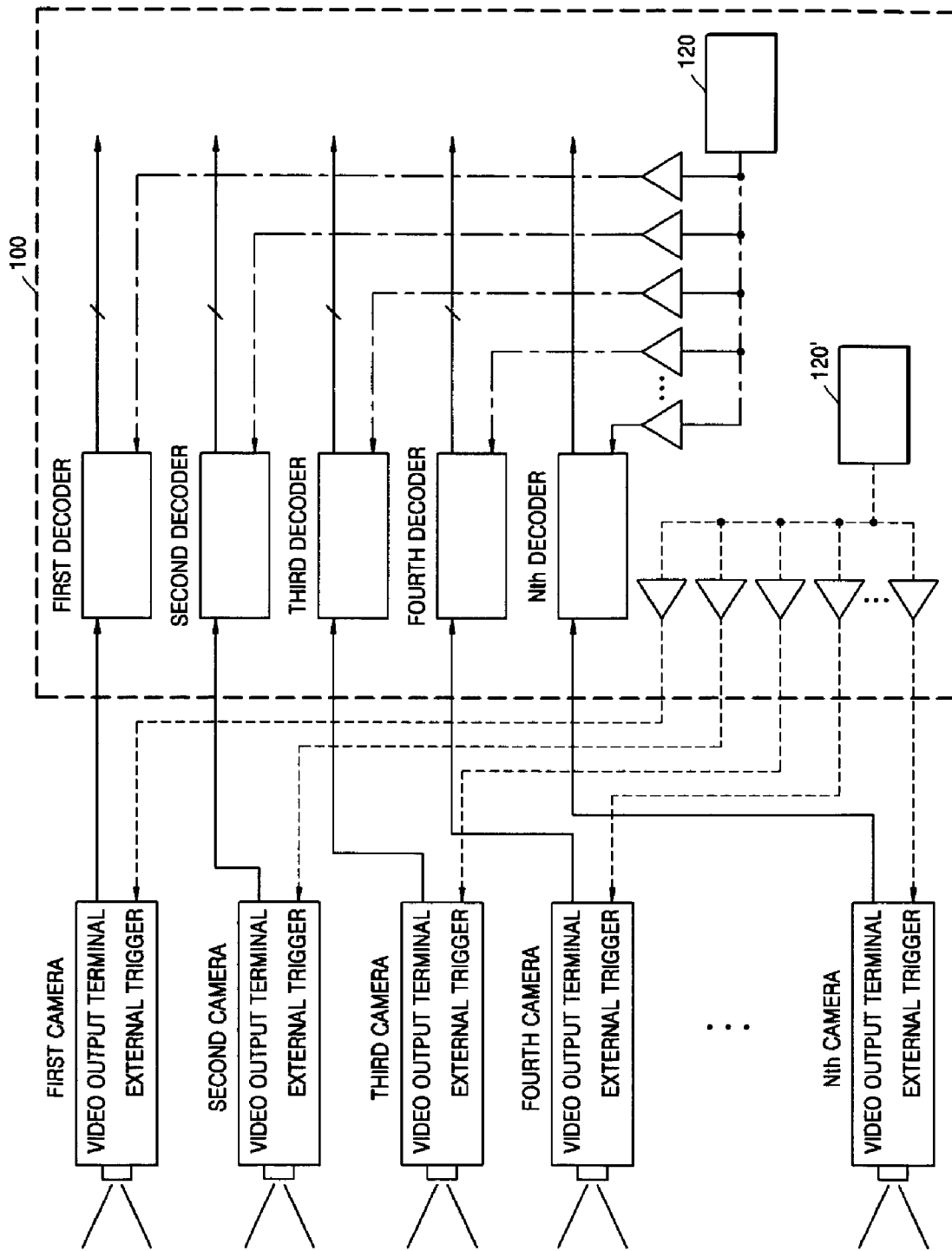
FIGS. 4a and 4b are block diagrams of video decoders and a synch signal generator of FIG. 3.
Figure 4B:
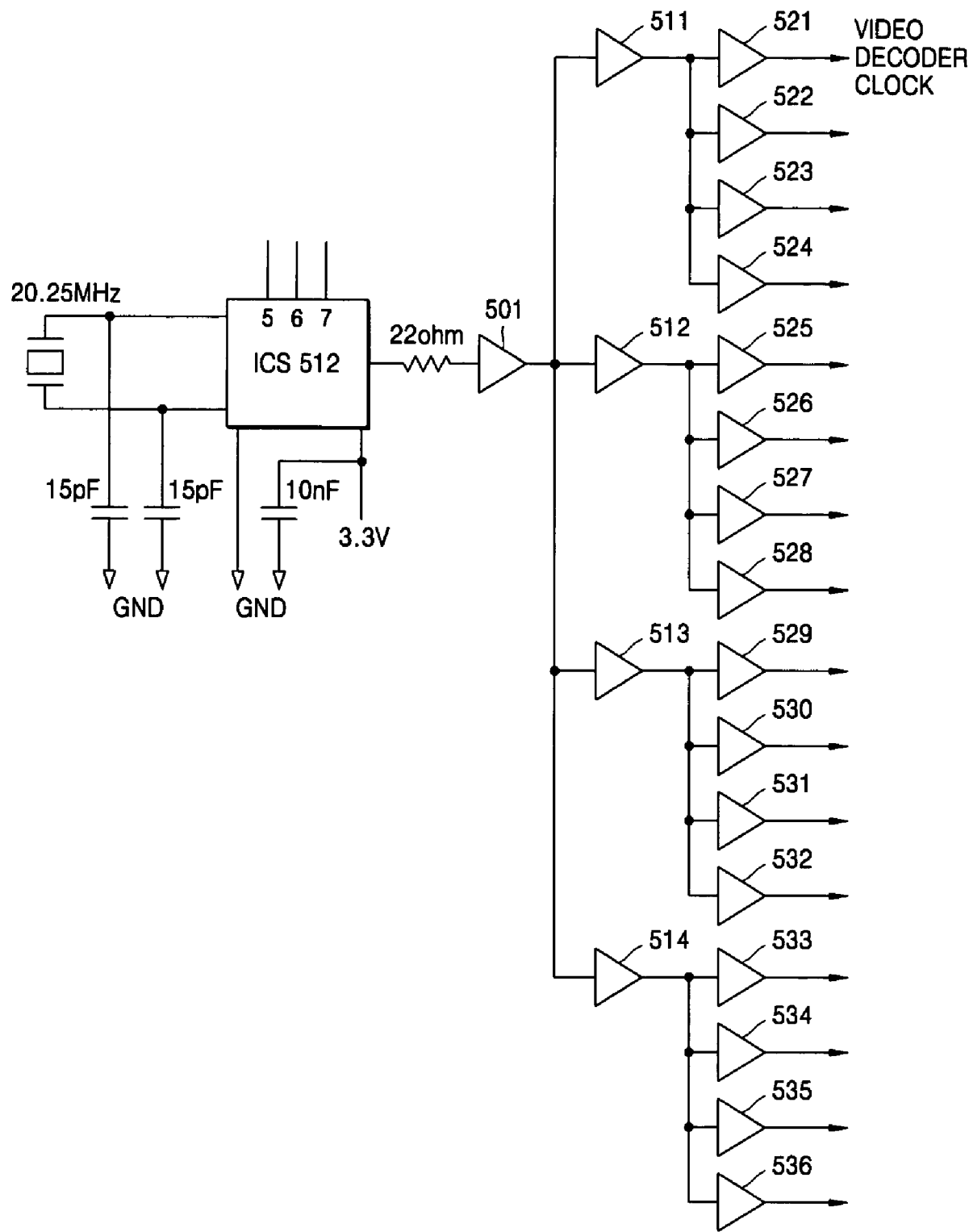

FIGS. 4A and 4B are block diagrams of the video decoders 110 and the sync signal generator 120 of FIG. 3. A multi-visual-point image processing apparatus includes a plurality of image sources 10 and a plurality of video decoders 110. Accordingly, it is important to synchronize the image sources 10 and the video decoders 110. Otherwise, pixels photographed at different times can be mixed with pixels in an image formed on a macro pixel, and a sense of 3-D stereoscope cannot be realized, and an unnatural image such as a blanking signal is produced.

In the present embodiment, the above-described problem is solved not by using an internal clock, but external clocks of the video decoders 110. The external clocks operate in response to the sync signal generator 120 as shown in FIGS. 4a and 4b. The image sources 10 can also be synchronized using sync signals like the video decoders 110. In this case, the sync signals generated by a sync signal generator 120' are respectively transmitted to external trigger terminals of the image sources 10 via digital buffers. A video encoder (not shown) can be used as the sync signal generator 120', and a sync signal excluding any other input signals is used.

The sync signal generators 120 and 120' can be connected to the video decoders 110 and the image sources 10 via buffers arranged in a row or hierarchically arranged in a tree structure. When 16 image sources 10 are used, 4*4 tree structured buffers in which 4 buffers are each hierarchically connected to 4 other buffers are used. As shown in FIG. 4b, a generated sampling clock signal with a frequency of 20.25 MHz is input to the video decoders 110 by being hierarchically synchronized via a buffer 501, buffers 511 through 514, and buffers 521 through 536. Superior synchronization can be achieved using the hierarchical synchronization with a tree structure.

The signals 111 generated by the input unit 100 are input to the 3-D image processing unit 200. The 3-D image processing unit 200 converts digital image signals from 16 visual-points into signals suited to a 3-D display apparatus by de-interlacing, scaling, and multiplexing the digital image signals.

The 3-D image processing unit 200 includes a scan converter 210, a vertical scaler 220, a vertical multiplexer 230, and a horizontal multiplexer 240.

The scan converter 210 converts interlaced image signals into image signals with a progressive scanning type to obtain high resolution images (de-interlacing). The de-interlacing is realized by reading and interpolating frames (even fields+odd fields) stored in the memory 400 at a reading speed two times faster than a writing speed. The de-interlacing can be performed in a weave mode or a bob mode.

Figure 5A:
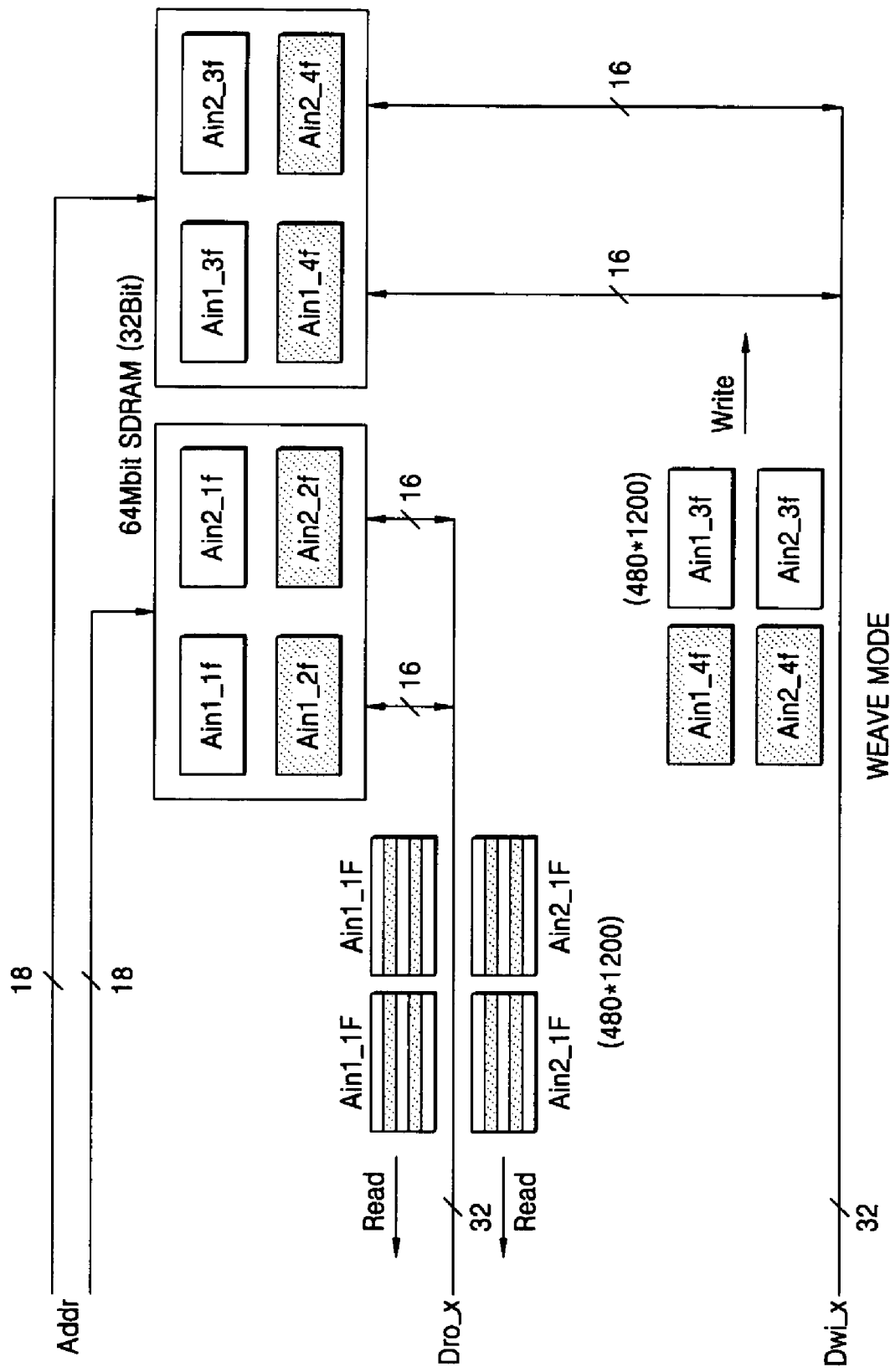
FIGS. 5a and 5b illustrate de-interlacing of a weave mode and a bob mode, respectively.
Figure 5B:
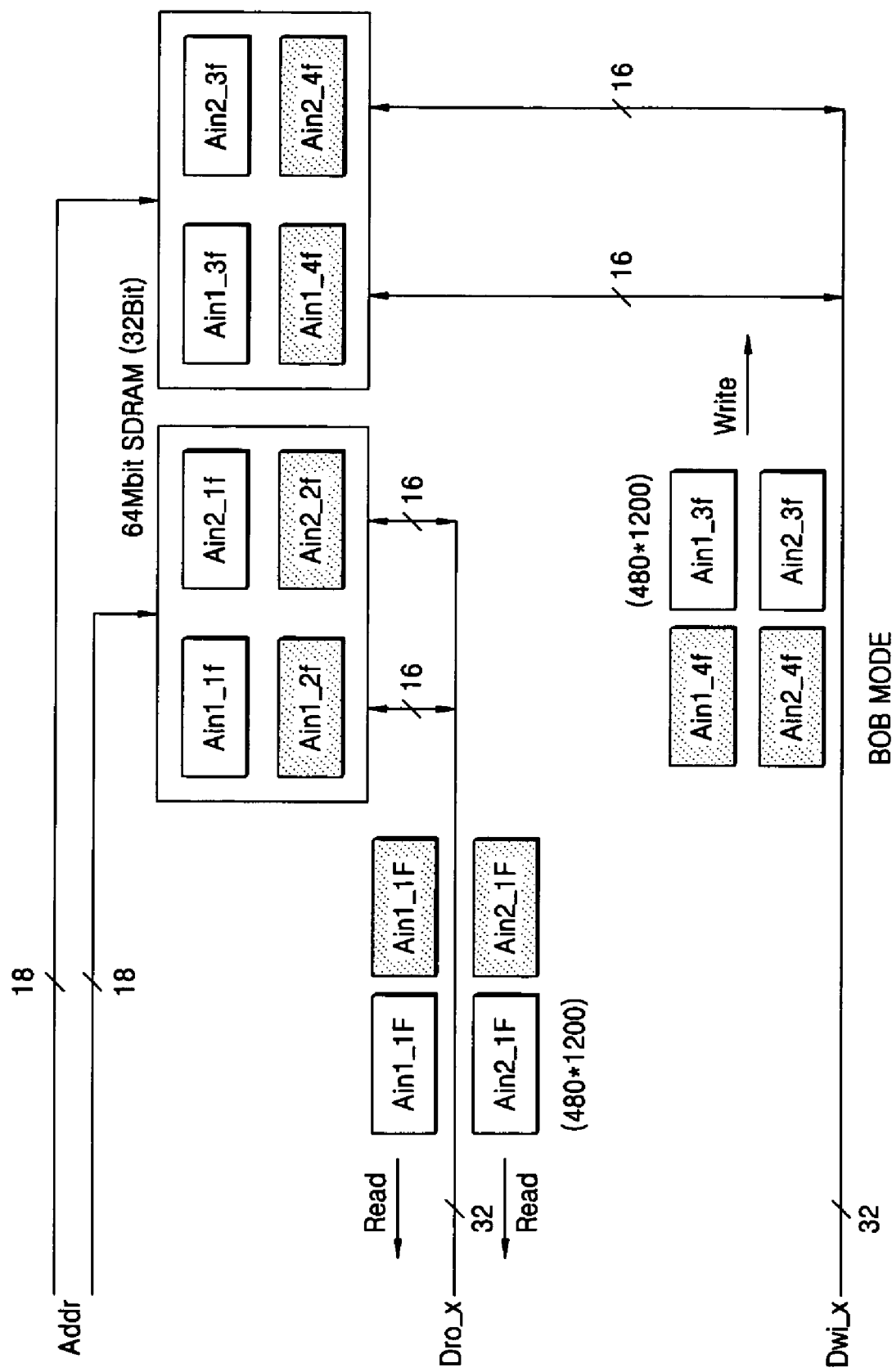

FIGS. 5A and 5B illustrate de-interlacing in the weave mode and the bob mode, respectively. Both modes can be easily realized by read addressing of the memory 400.

In the weave mode illustrated by FIG. 5a, an output Dwi_x of a video decoder 110 is written to a memory 400 with a 480*240 resolution. If 64 MB SDRAM controlling data with storage in 32-bit units is used as the memory 400, since the output Dwi_x of the video decoder 110 is a 16-bit YCrCb signal, two fields can be simultaneously written to a single memory unit. As shown in FIG. 5a, a first field Ain1_1f of a first image source and a first field Ain2_1f of a second image source are simultaneously written to a single memory unit. Next, a second field Ain1_2f of the first image source and a second field Ain2_2f of the second image source are simultaneously written to the same memory unit. However, when they are read, the first field Ain1_1f of the first image source and the second field Ain1_2f of the first image source are simultaneously interpolated and read by changing a read addressing signal of the controller 300. Furthermore, since the reading speed is two times faster than the writing speed, two identical frames Ain1_1F are generated. Likewise, in other memory units, reading and writing are performed in the same way. Therefore, one scan converter 210 simultaneously processes outputs of 4 video decoders 110. When a 64 MB SDRAM controlling data in 32-bit units is used, the number of SDRAMs interfaced to each scan converter 210 is 4, and the total bit amount is 4*32=128 bits.

FIG. 5B illustrates de-interlacing in the bob mode. A method of writing data to the memory 400 in the bob mode is the same as that in the weave mode. However, when reading is performed, two double scanned frames Ain1_1F are generated by reading data double at a same position using repeated read addressing. Also, unlike the weave mode, since the two frames Ain1_1F generated in the bob mode are generated by doubling a same field, they are actually different images.

Since two fields over a time interval are mixed in the weave mode (temporal interpolation), the weave mode is suited to a still image, and since a frame is generated by doubling a same field in the bob mode (spatial interpolation), the bob mode is suited to a moving picture having lots of motion. A user can select one of the two modes according to a reproducing image type.

Figure 6:
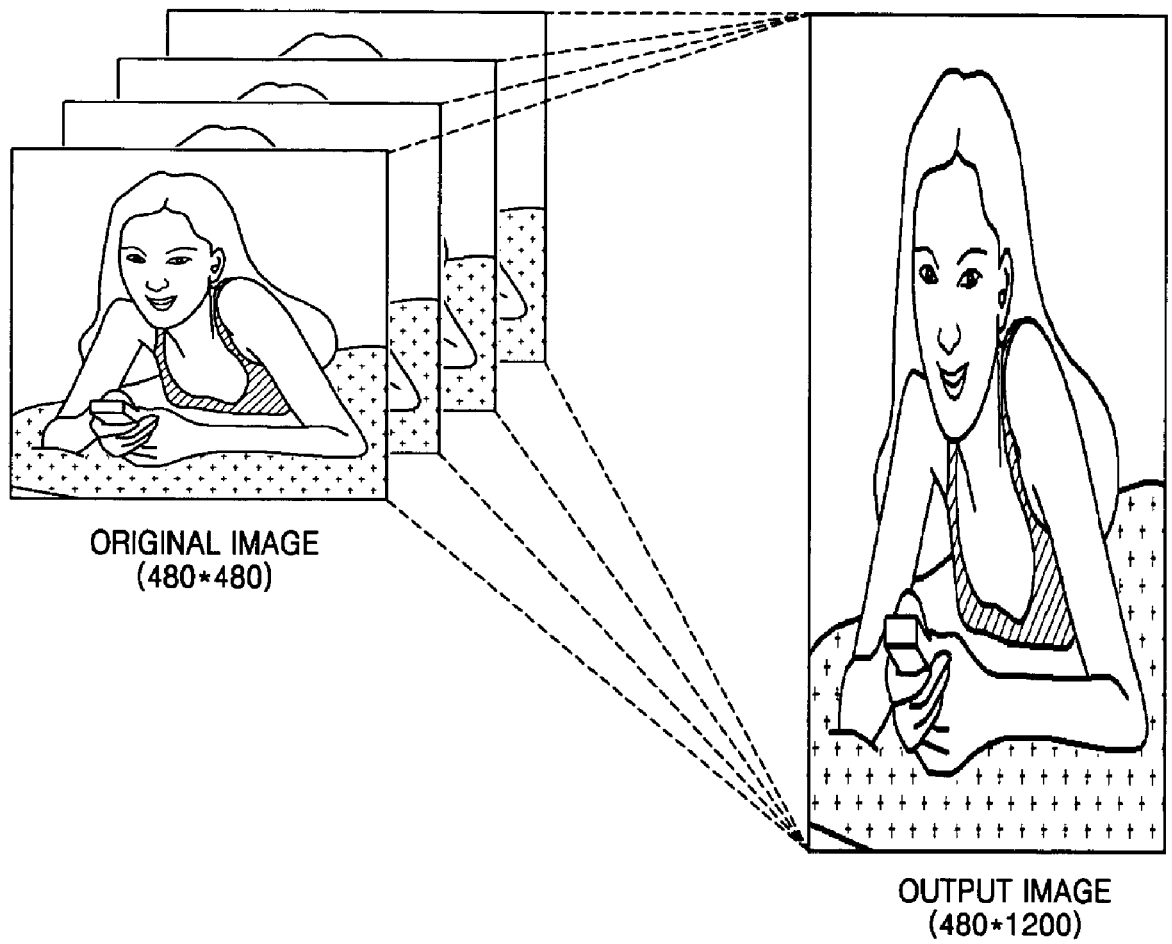
FIG. 6 illustrates a vertical scaling function.

An image signal 211 de-interlaced by the scan converter 210 is scaled to vertical resolution of a display apparatus by the vertical scaler 220. In the present embodiment, since the de-interlaced image signal 211 has a 480*480 resolution, in order to fit to vertical resolution of a display apparatus with a 1920*1200 resolution, it is necessary to scale the de-interlaced image signal 211 in the vertical direction by 1200/480=2.5 times. The scaling can be performed by changing a memory addressing signal in a de-interlacing process of the scan converter 210. That is, the scaling is performed by generating a read memory control signal 303 by which line addresses are repeatedly read (by 2.5 times) in a sequence of 1, 1, 1, 2, 2, 3, 3, 4, 4, 4, . . . in response to a write memory control signal 302 input in a sequence of 1, 2, 3, 4, . . . . FIG. 6 illustrates the vertical scaling function.

The vertically scaled signal 221 is input to the vertical multiplexer 230 and the horizontal multiplexer 240 in succession in order to be vertically and horizontally multiplexed to a resolution suited to the display apparatus. As described above, signals 11 received from 4 image sources 10 belonging to a same row are converted into digital signals Dwi_x 111 by 4 video decoders 110, respectively, and the 4 digital signals Dwi_x 111 are converted into a 480*1200 digital signal Dro_x 221 by the scan converter 210 and the vertical scaler 220 using memory input/output controlling.

Figure 7:
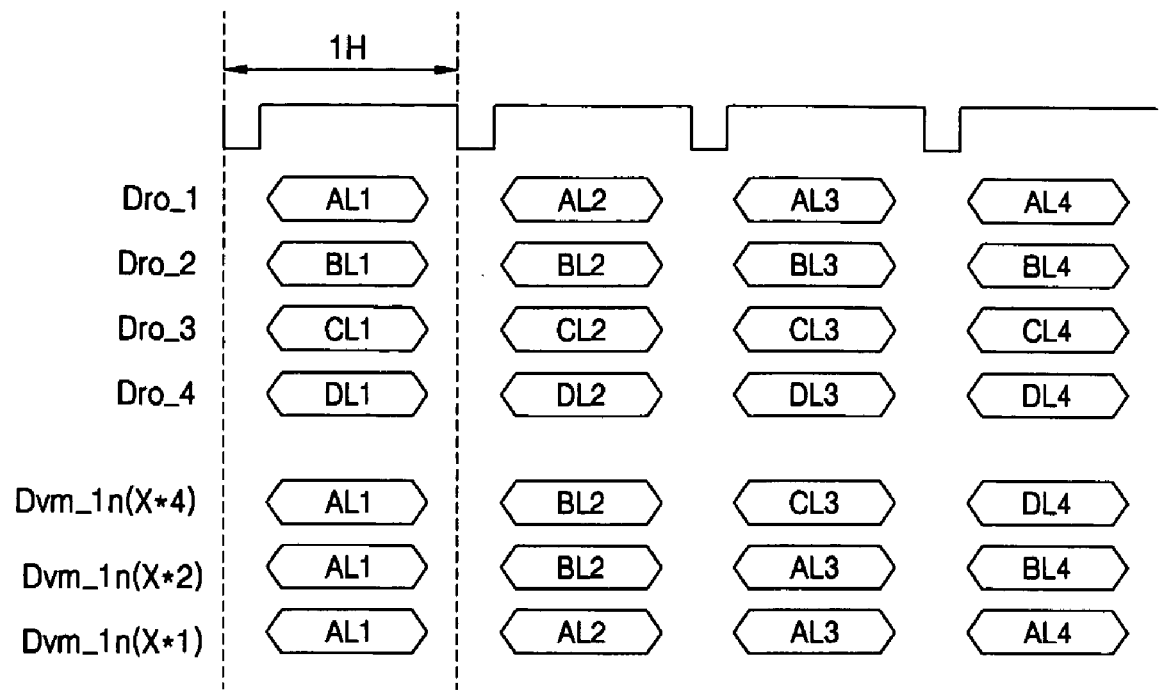
FIG. 7 illustrates vertical multiplexing signals obtained from image sources of a first row.
Figure 9:
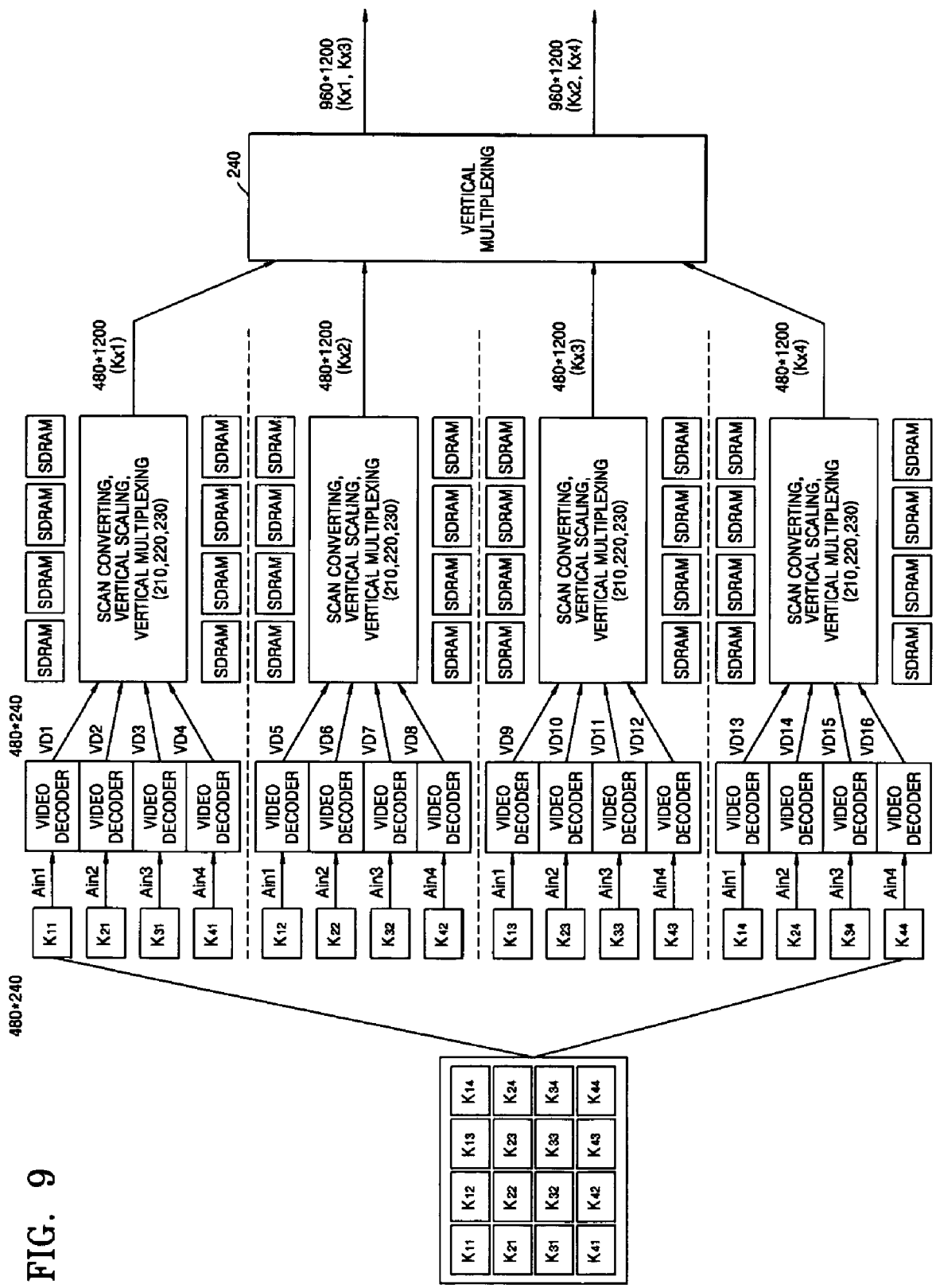
FIG. 9 illustrates a relationship between the number of input/output signals and a resolution of each image processing process in a 4*4 mode.

FIG. 7 illustrates vertical multiplexing signals received from the image sources 10 of a first row in various modes (X*4, X*2, and X*1). Referring to FIGS. 7 and 9, a signal Dro_1 from a first image source K11 has 1200 horizontal lines AL1, AL2, AL3, . . . , AL1200, a signal Dro_2 from a second image source K21 also has 1200 horizontal lines AL1, AL2, AL3, . . . . , AL1200, and likewise for third and forth image sources K31 and K41. If multi-visual-point images are processed using an arrangement of the image sources 10 with 4 columns, that is, in an X*4 mode, the vertical multiplexer 230 selects horizontal lines in an order of AL1, BL2, CL3, DL4 (AL5, BL6, CL7, DL8, . . . not shown), (that is, Dro_1, Dro_2, Dro_3, and Dro_4 are alternatively selected), in an X*2 mode, the vertical multiplexer 230 selects horizontal lines in an order of AL1, BL2, AL3, BL4, (AL5, BL6, . . . not shown) (that is, Dro_1 and Dro_2 are alternatively selected), and in an X*1 mode, the vertical multiplexer 230 selects horizontal lines in an order of AL1, AL2, AL3, AL4, BL5, BL6, . . . (that is, only Dro_1 is selected). The vertical multiplexed signals according to modes are Dvm_1n(X*4), Dvm_1n(X*2), and Dvm_1n(X*1), as shown in FIG. 7. Here, 1n represents that a signal from image sources in a first row is vertical multiplexed, and X represents the number of camera rows according to each mode. The multiplexing can be realized with a gate logic circuit, and the multiplexing technology is widely known to those skilled in the art.

Figure 8:
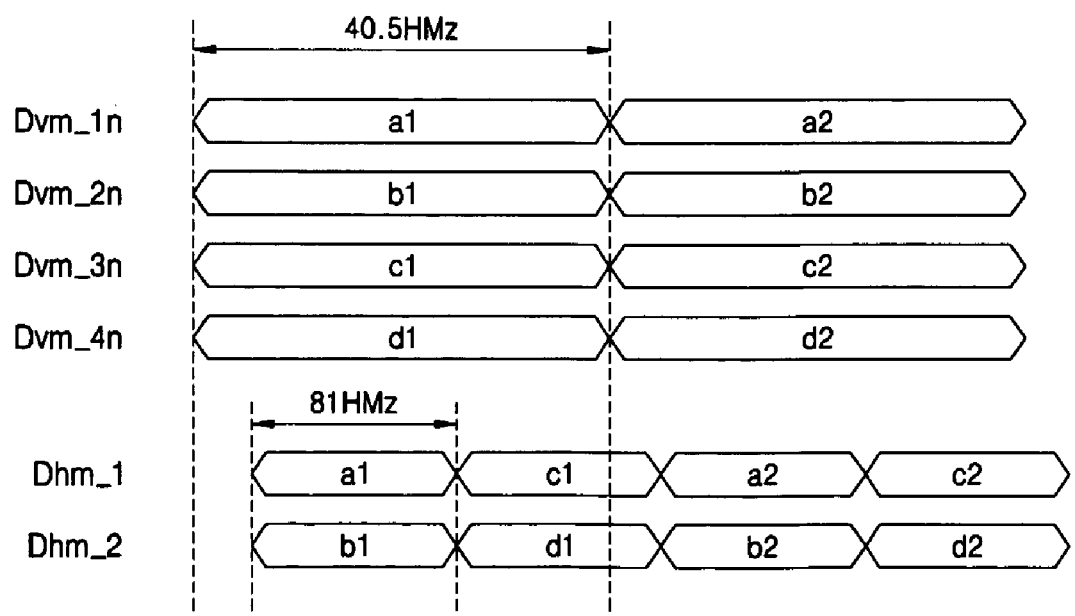
FIG. 8 illustrates horizontal multiplexing in a 4*4 mode.

FIG. 8 illustrates horizontal multiplexing of the vertical multiplexed signals 231 in a 4*4 mode.

Signals Dvm_1n, Dvm_2n, Dvm_3n, and Dvm_4n from image sources of 4 rows are selected so that the signals received from the image sources of first and third rows and second and fourth rows are respectively alternated. The alternated signals are output as horizontal multiplexed signals 241 Dhm_1 and Dhm_2, respectively. That is, the output signal Dhm_1 selects first 480 bits of vertical data a1 from the signal Dvm_1n in which the signals received from the image sources of the first row are vertically multiplexed, and then selects first 480 bits of vertical data c1 from the signal Dvm_3n in which the signals received from the image sources of the third row are vertically multiplexed, that is, vertical data from each row is alternatively selected (a1, c1, a2, c2, . . . ). The output signal Dhm_2 alternatively selects the image signals received from the image sources of the second and fourth rows (b1, d1, b2, d2, . . . ). Here, a multiplexing speed, that is, a clock speed, can be changed according to a signal specification of a display apparatus. FIG. 8 shows a case where, when the signal specification of the display apparatus is 162 MHz, a clock speed of the 3-D image processing unit 200 is 40.5 MHz, and the multiplexing speed is 81 MHz which is obtained by dividing 162 MHz by 2. The output signals Dhm_1 and Dhm_2 are synchronized at 81 MHz and respectively input to first and second lines of a panel link apparatus (low voltage differential signals: LVDS) for being input to a display apparatus, and displayed on the display apparatus with a frequency of 162 MHz.

FIG. 9 illustrates a relationship between the number of input/output signals and a resolution of each image processing process for arrangement of the image sources in the 4*4 mode.

16 image signals K11 through K44 from image sources 10 arranged in the 4*4 mode are input to video decoders Ain1 through Ain16, respectively. Here, output signals VD1 through VD16 of the video decoders are interlaced digital image signals with the same resolution (480*240) as the resolution of the image sources. The outputs of the 16 video decoders Ain1 through Ain16 are divided into 4 units, each unit including 4 video decoder outputs, and each unit is sequentially input to one of the scan converters 210, one of the vertical scalers 220, and one of the vertical multiplexers 230. An output signal of the vertical multiplexer 230 is a progressively scanned digital image signal (480*1200) with the same vertical resolution (*1200) as vertical resolution (*1200) required for a signal input to a display apparatus. The output signals of the four vertical multiplexers 230 are input to one horizontal multiplexer 240, converted into two display apparatus input signals (960*1200) with two-divided clock (81 MHz) of a clock (162 MHz) of the display apparatus, and input to the display apparatus.

In the present embodiment, the image signal processing of a case where image sources are arranged in the 4*4 mode is described. However the present invention can be applied to various arranging methods of image sources; that is, various space-division modes. Hereinafter, embodiments of the present invention for realizing image signal processing in modes besides the 4*4 mode will now be described. To do this, several additional components are introduced.

Figure 10:
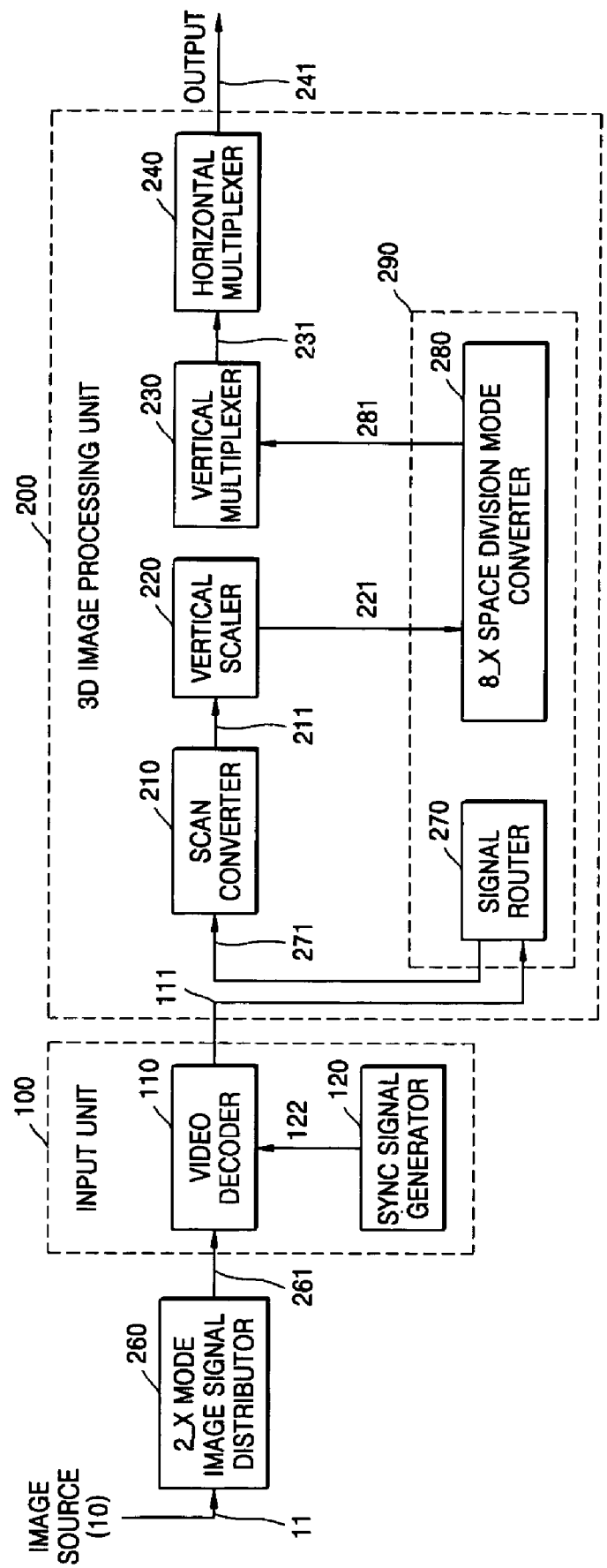
FIG. 10 is a block diagram of a 3-D image signal processing apparatus, which can be applied to various space-division modes, according to another exemplary embodiment of the present invention.

FIG. 10 is a block diagram of a 3-D image signal processing apparatus, which can be applied to various space-division modes, according to another exemplary embodiment of the present invention. The space-division modes supported by the present embodiment are 4*4, 4*2, 4*1, 8*2, 8*1, 2*2, and 2*1 modes. The additional components are a space division mode converter 290 and a 2_X mode image signal distributor 260. The space division mode converter 290 includes an 8_X space division mode converter 280 and a signal router 270. The additional components will now be described according to the modes.

(1) 8*X Mode

Referring to FIG. 9, in the 4*4 mode, 4 image sources would be processed from the scan converter 210 to the vertical multiplexer 230 in a single 3-D image processing unit 200. However, in the 8*X mode, since the number of rows of the image sources is 8, the 8 image signals cannot be input to a single 3-D image processing unit 200 by a hardware structure. Accordingly, modification of the hardware structure is required. In the present embodiment, the 8*X mode signals can be processed using an existing hardware configuration without introducing a new 3-D image processing unit.

By a related art method of processing the 8*X mode signals in a 4*4 mode hardware configuration, image signals Kx5, Kx6, Kx7, and Kx8 of a fifth row to a eighth row are de-interlaced by regarding the image signals as signals K31 through K34 and K41 through K44 in the 4*4 arrangement, vertical scaling of the de-interlaced image signals is performed, and the scaled image signals are restored to original image signal positions before the scaled image signals are vertically multiplexed.

Figure 11A:
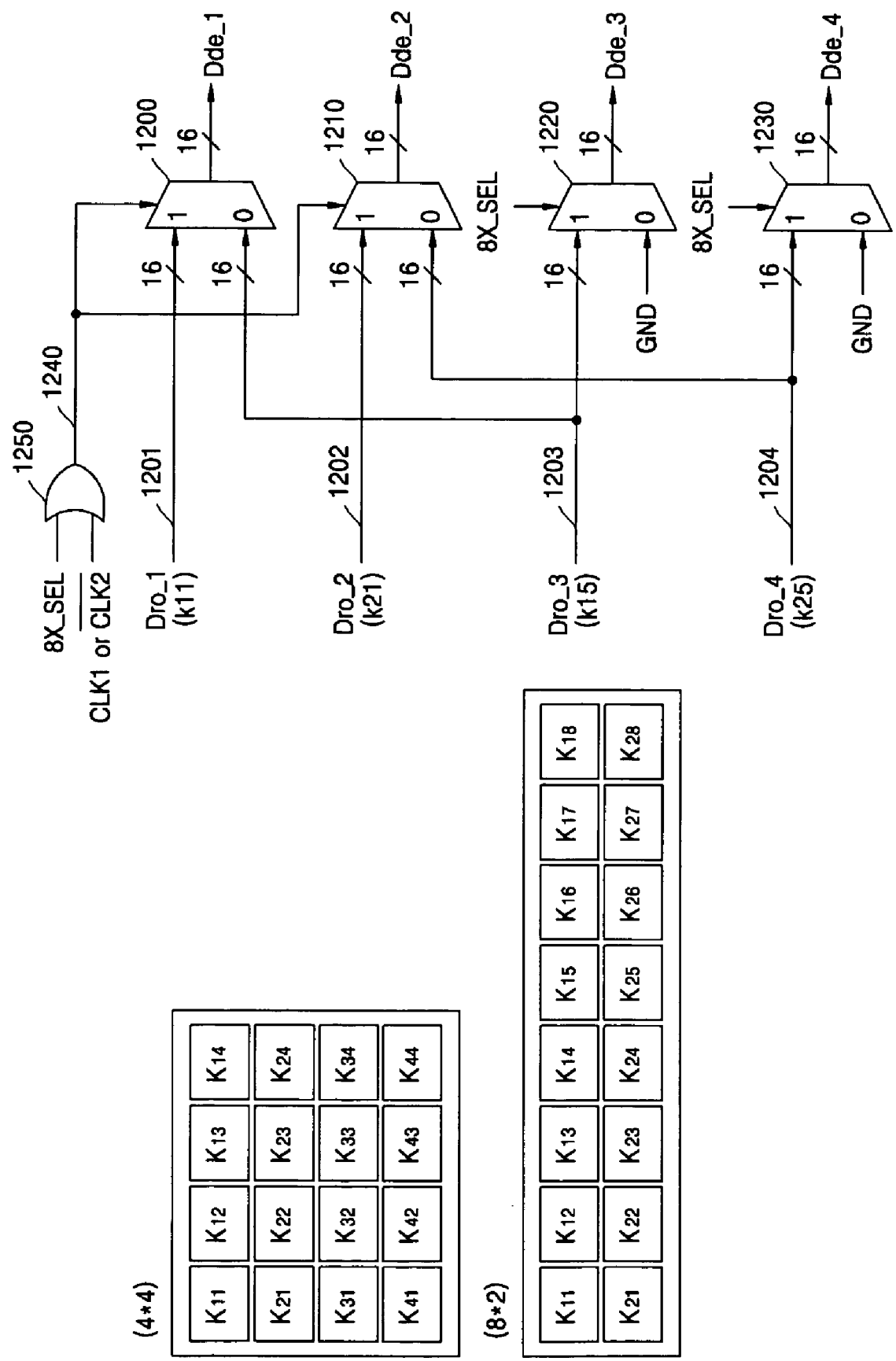
FIG. 11A is a schematic diagram of an 8_X space-division mode converter converting 8*2 mode signals into 4*4 mode signals.

FIG. 11A is a schematic diagram of the 8_X space-division mode converter 280 converting 8*2 mode signals into 4*4 mode signals. In the 8*2 mode, image signals K15 through K18 are processed as image signals K31 through K34, respectively, and image signals K25 through K28 are processed as image signals K41 through K44, respectively. That is, the image signals K15 through K18 are input to input terminals of the video decoders for the image signals K31 through K34, and the image signals K25 through K28 are input to input terminals of the video decoders for the image signals K41 through K44. The input image signals K15 through K18 and K25 through K28 are de-interlaced and vertically scaled in the related art method and input to the 8_X space division mode converter 280.

Figure 11B:
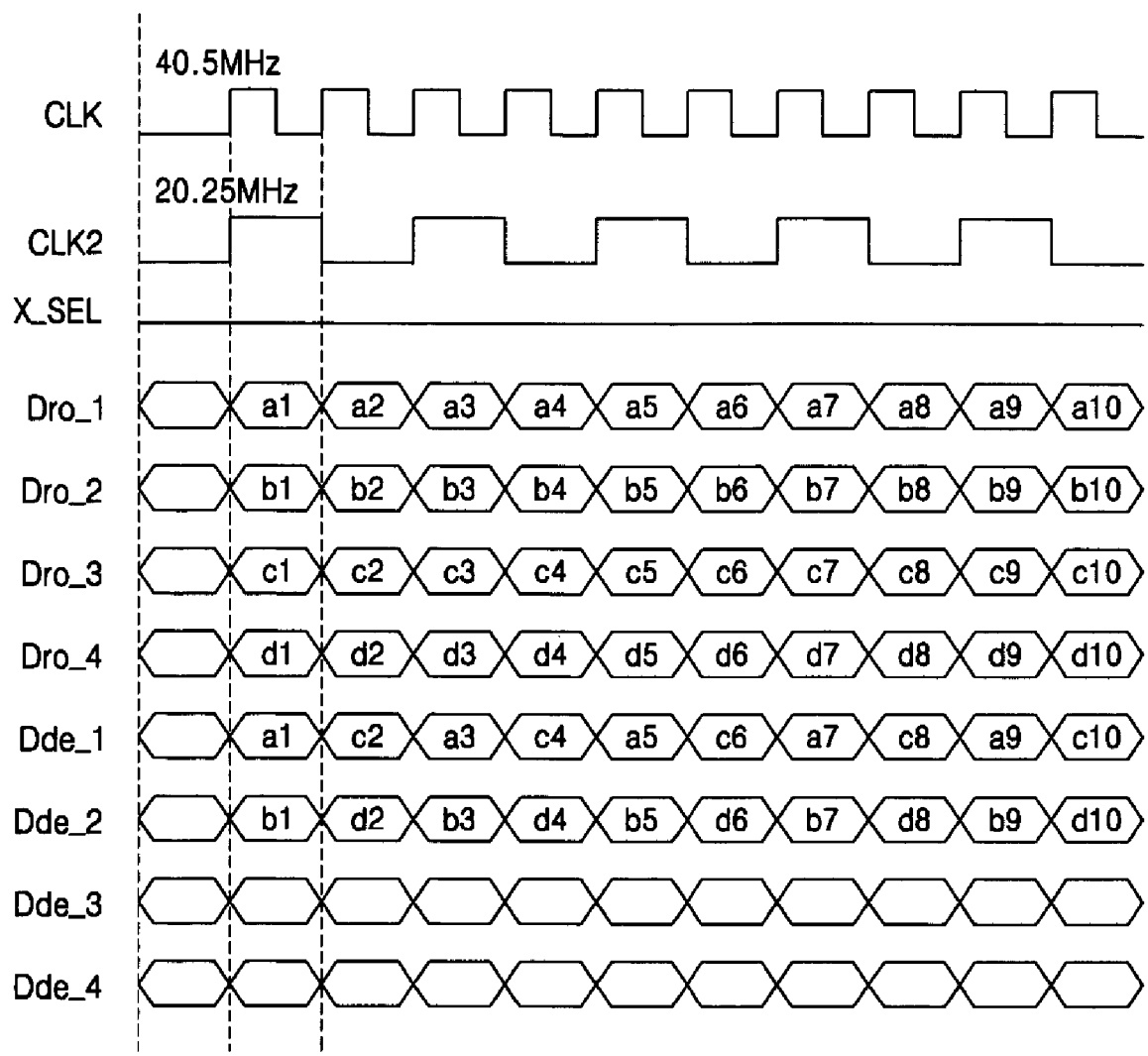
FIG. 11B illustrates a correlation between input/output signals when 8_X space-division mode converting is performed.

Signals 1201, 1202, 1203, and 1204 are obtained by de-interlacing and vertically scaling the image signals K11, K21, K15, and K25, respectively. In order to restore the vertical scaled signals to their original image signal positions, a first data selector 1200 alternatively selects an image signal 1201 and an image signal 1203 in response to a user mode select signal 8X_SEL and an 8_X select clock signal CLK2. That is, if the user mode select signal 8X_SEL is enabled, the first data selector 1200 selects and outputs the image signal 1203 during one cycle of the 8_X select clock signal CLK2, and a third data selector 1220 selects a ground input and does not output any signals. Accordingly, the image signal 1203 is output as an output signal Dde_1 next to the image signal 1201, and 0 is output as an output signal Dde_3. Likewise, second and fourth selectors 1210 and 1230 operate in the same way, and, accordingly, the image signal 1204 is output as an output signal Dde_2 next to the image signal 1202, and 0 is output as an output signal Dde_4. FIG. 11B illustrates a correlation between input/output signals of the 8_X space division mode converter 280 of FIG. 11A.

(2) The Number of Image Sources is Less than 16

When the number of image sources is less than 16, that is, in a case of 4*2, 4*1, 8*1, 2*2, and 2*1 modes, if no input signals are input to corresponding input terminals of the 3-D image processing unit 200, a hardware configuration of the vertical multiplexer 230 must be set differently according to modes. This problem can be solved by including the signal router 270 (FIG. 10) between the input unit 100 and the 3-D image processing unit 200.

Figure 12:
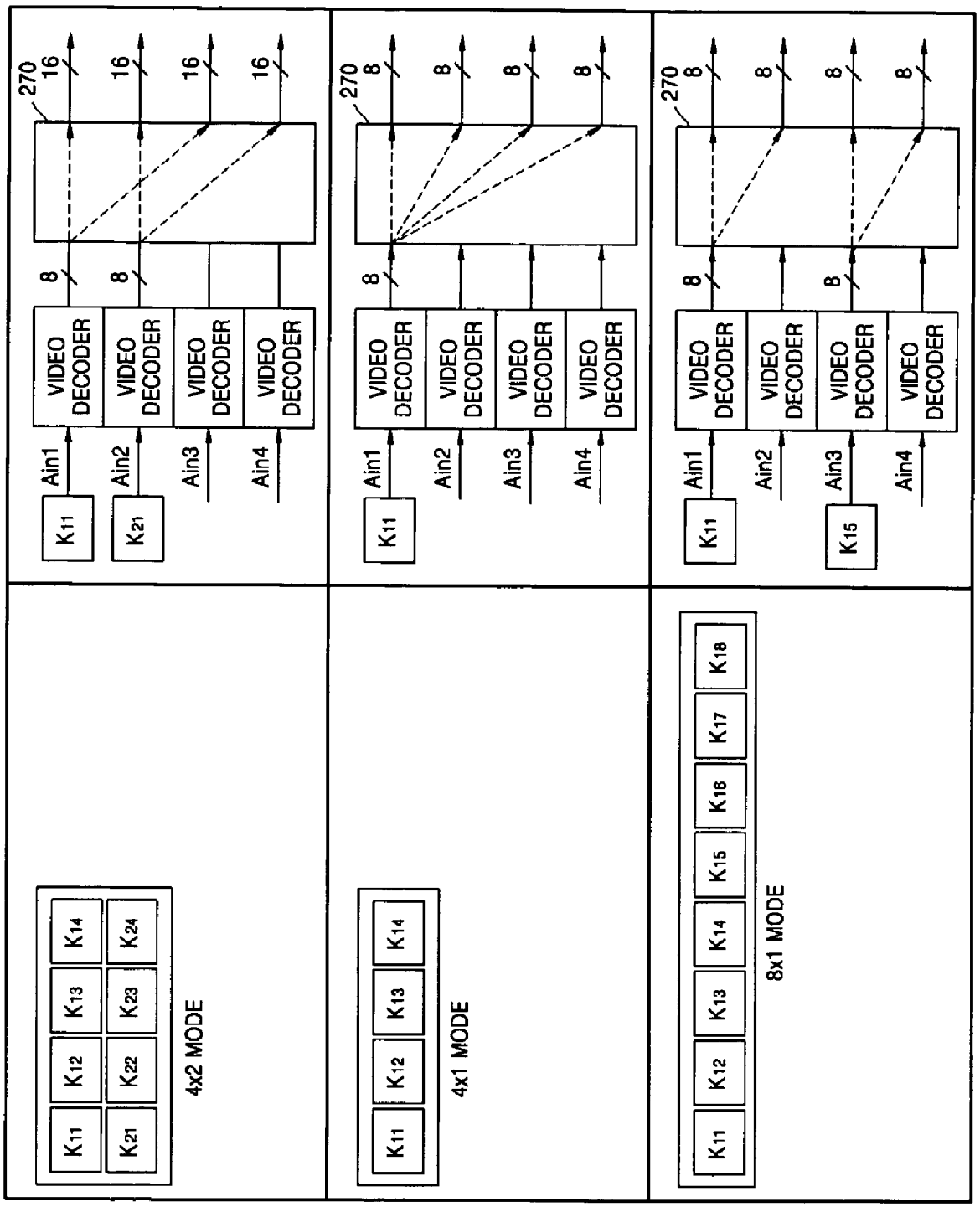
FIG. 12 illustrates an internal configuration of a signal router according to modes.

FIG. 12 illustrates an internal configuration of the signal router 270 according to appropriate modes. For convenience of description, only one router 270 is shown. In the 4*2 mode, image signals input to only input terminals Ain1 and Ain2 are also routed to input terminals of the 3-D image processing unit 200 corresponding to input terminals Ain3 and Ain4, respectively. In the 4*1 mode, an image signal input to the input terminal Ain1 is routed to all input terminals of the 3-D image processing unit 200 corresponding to input terminals Ain2, Ain3, and Ain4. In the 8*1 mode, an image signal input to the input terminal Ain1 is routed to input terminals of the 3-D image processing unit 200 corresponding to input terminals Ain1 and Ain2, and an image signal input to the input terminal Ain3 is routed to input terminals of the 3-D image processing unit 200 corresponding to input terminals Ain3 and Ain4. Accordingly, in the 3-D image processing unit 200, there are no input terminals to which image signals are not input, and the vertical multiplexing can be processed in the same way as in the 4*4 mode.

In a 2*X mode, after image signals are converted into the same type as image signals of the 4*X mode by the 2_X mode image signal distributor 260 (FIG. 10) described below, input terminal routing of the 4*X mode as described above is performed.

(3) 2*X Mode

In 2*2 and 2*1 modes, there are 3-D image processing units 200 to which no image signals are input, so even if the signal routers 270 are used, input terminals must be included in the 3-D image processing units 200. To solve this problem, the 2_X mode image signal distributor 260 is included between the image sources 10 and the input unit 100.

Figure 13A:
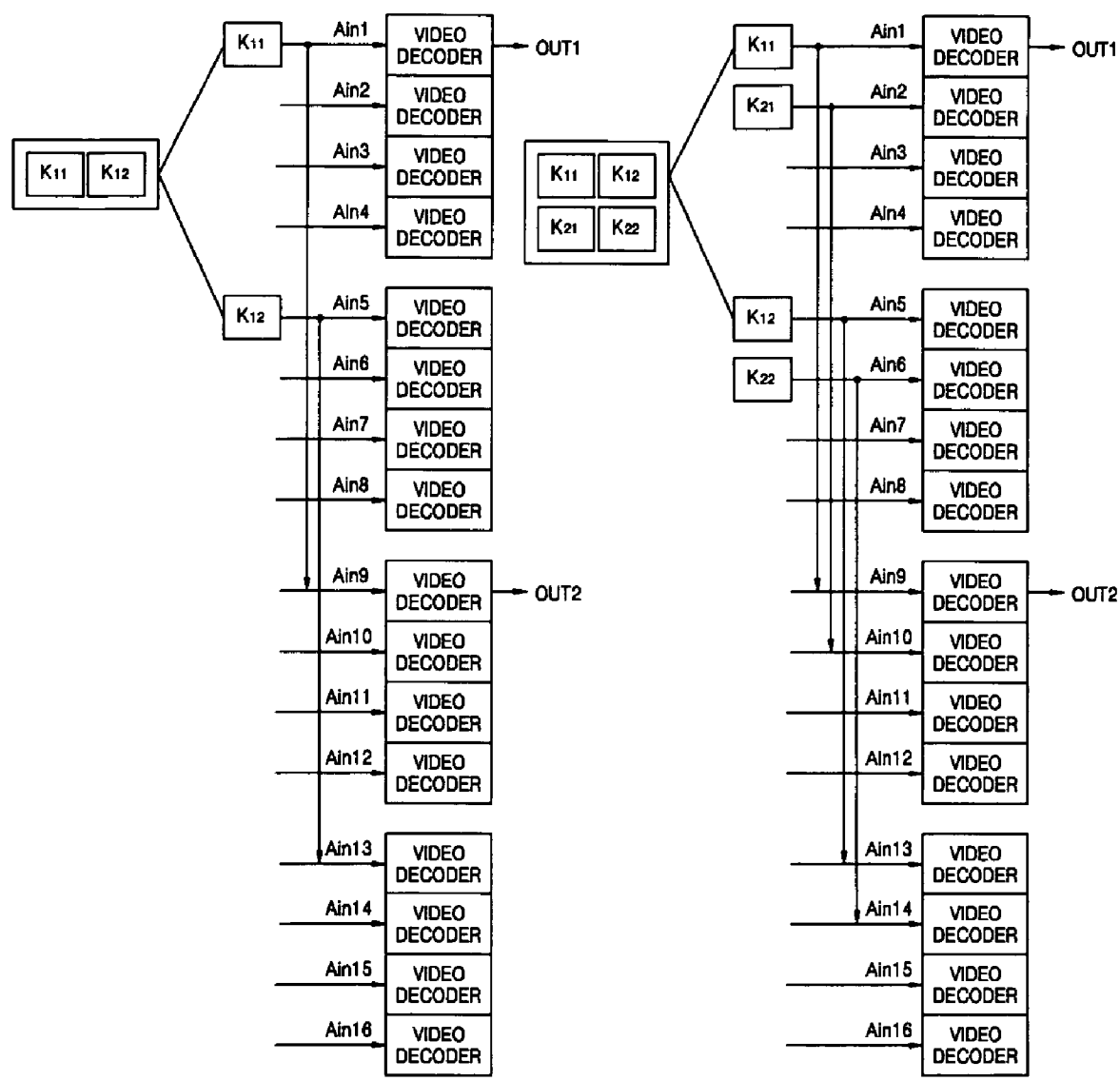
FIG. 13A illustrates a configuration for generating at least one input signal for each 3-D image signal processing unit to which input signals are not input in 2*1 and 2*2 modes, respectively.

FIG. 13A illustrates a configuration for generating at least one input signal for each 3-D image processing unit 200 to which no input signals are input in the 2*1 and 2*2 modes, respectively.

In the 2*1 mode, since 4 video decoders 110 are connected to one 3-D image processing unit 200, no image signals are input to third and fourth 3-D image processing units 200. The 2_X mode image signal distributor 260 inputs an image signal K11 input to an input terminal Ain1 of a first video decoder 110 to an input terminal Ain9 of a first video decoder 110 connected to the third 3-D image processing unit 200 and an image signal K12 input to an input terminal Ain5 of a fifth video decoder 110 to an input terminal Ain13 of a first video decoder 110 connected to the fourth 3-D image processing unit 200. Accordingly, the 2_X mode image signal distributor 260 inputs at least one image signal to each of the third and fourth 3-D image processing units 200.

In the 2*2 mode, since two image signals K11 and K21 are input to a first 3-D image processing unit 200 and two image signals K12 and K22 are input to a second 3-D image processing unit 200, the 2_X mode image signal distributor 260 inputs the image signals K11 and K21 to input terminals Ain9 and Ain10 of first and second video decoders 110 connected to a third 3-D image processing unit 200 and the image signals K12 and K22 to input terminals Ain13 and Ain14 of first and second video decoders 110 connected to a fourth 3-D image processing unit 200.

Figure 13B:
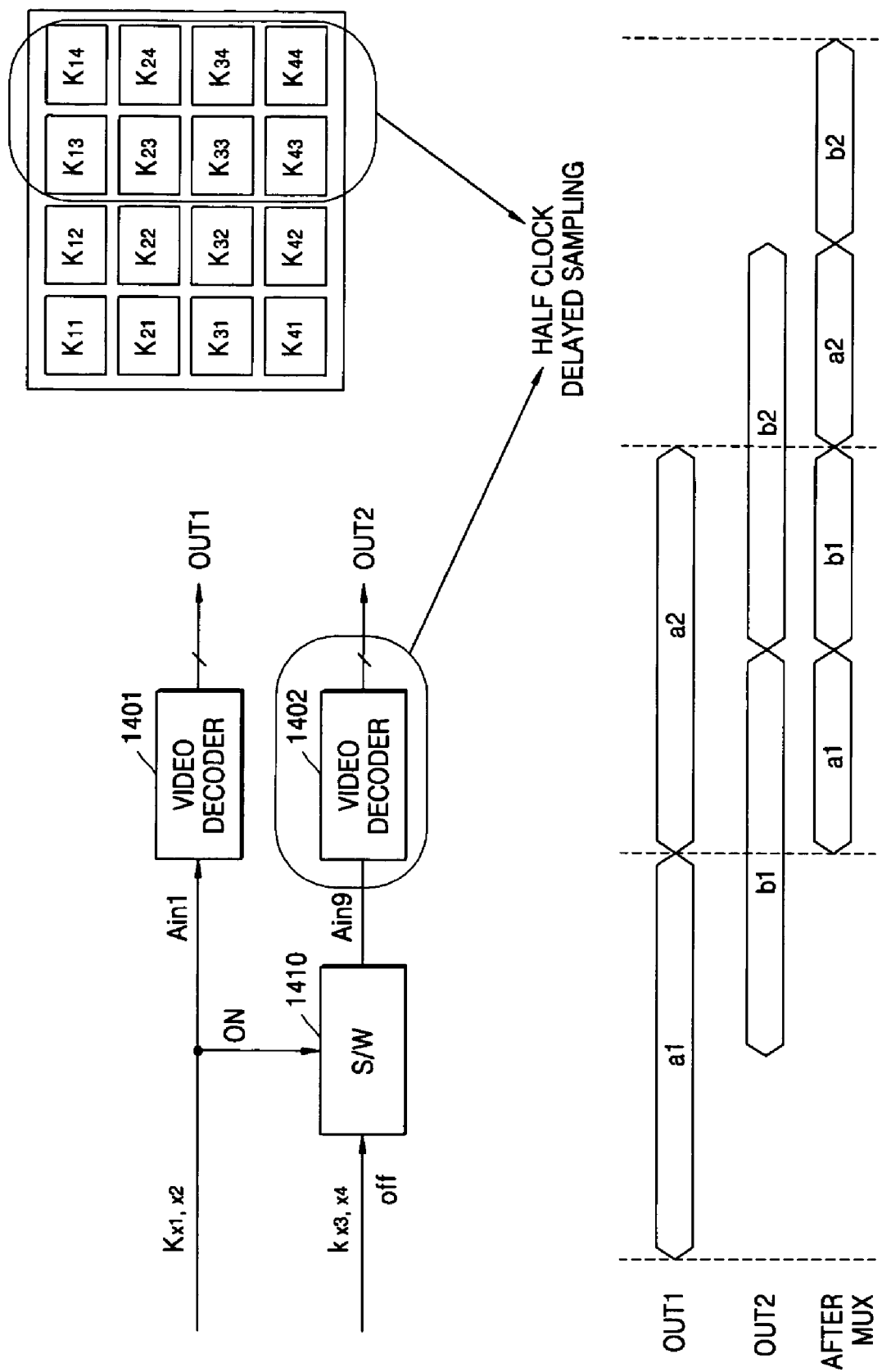
FIG. 13B illustrates an internal configuration of a 2_X mode image signal distributor.

FIG. 13B illustrates an internal configuration of the 2_X mode image signal distributor 260. The 2_X mode image signal distributor 260 includes a mode change switch 1410, which outputs signals by alternating between an input terminal receiving signals from image sources Kx1 and Kx2 and an input terminal receiving signals from image sources Kx3 and Kx4. If a user enables the 2_X mode image signal distributor 260 to use the 2*X mode, the mode change switch 1410 outputs all image signals received from the image sources Kx1 and Kx2 to input terminals Ain9 and Ain13 or Ain9, Ain10, Ain13, and Ain14 of video decoders 1402 to which image signals received from the image sources Kx3 and Kx4 would be input if the present mode were the 4*4 mode. Also, by setting a sampling period of the video decoder 1402 so as to be delayed by a ½ clock period, output signals OUT1 and OUT2 of two video decoders 1401 and 1402, respectively, and a multiplexed signal of the output signals OUT1 and OUT2 are produced as shown in FIG. 11B.

The 3-D image processing unit 200 can be realized with one field programmable gate array (FPGA) using HDL coding or mass produced using ASIC when hardware is actually configured. If costs are not considered, when the present invention is used for test equipment before mass production using ASIC, it is more convenient to use the FPGA capable of realizing various technologies by changing the HDL coding.

Figure 14A:
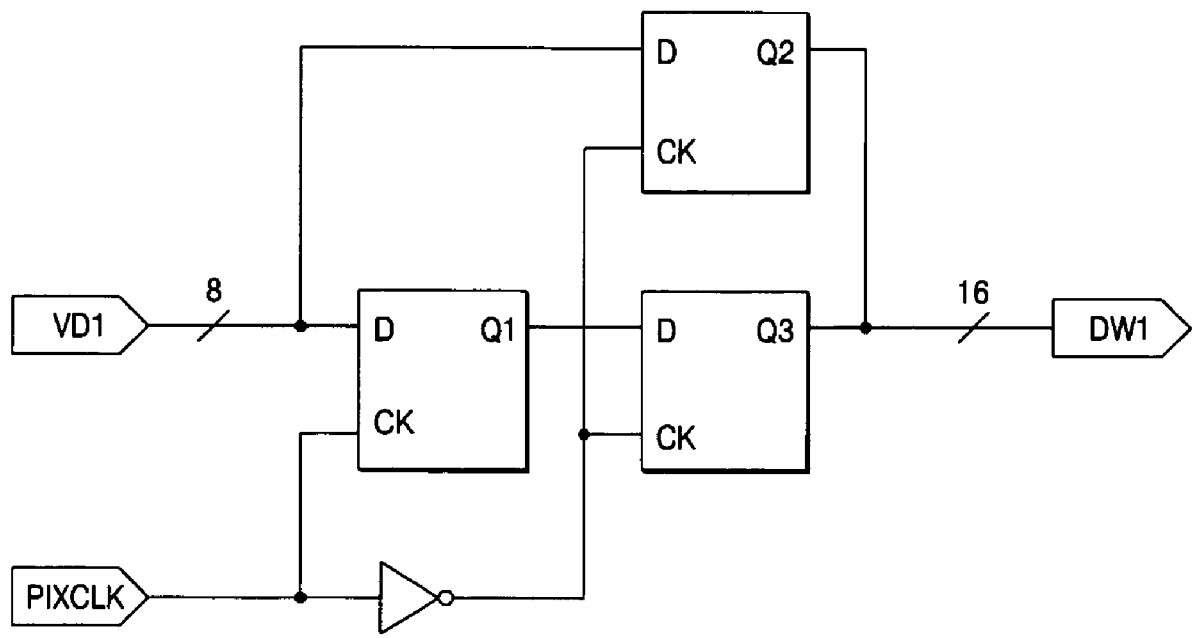
FIGS. 14A and 14B illustrate a configuration and function of an R656-R601 converter.
Figure 14B:
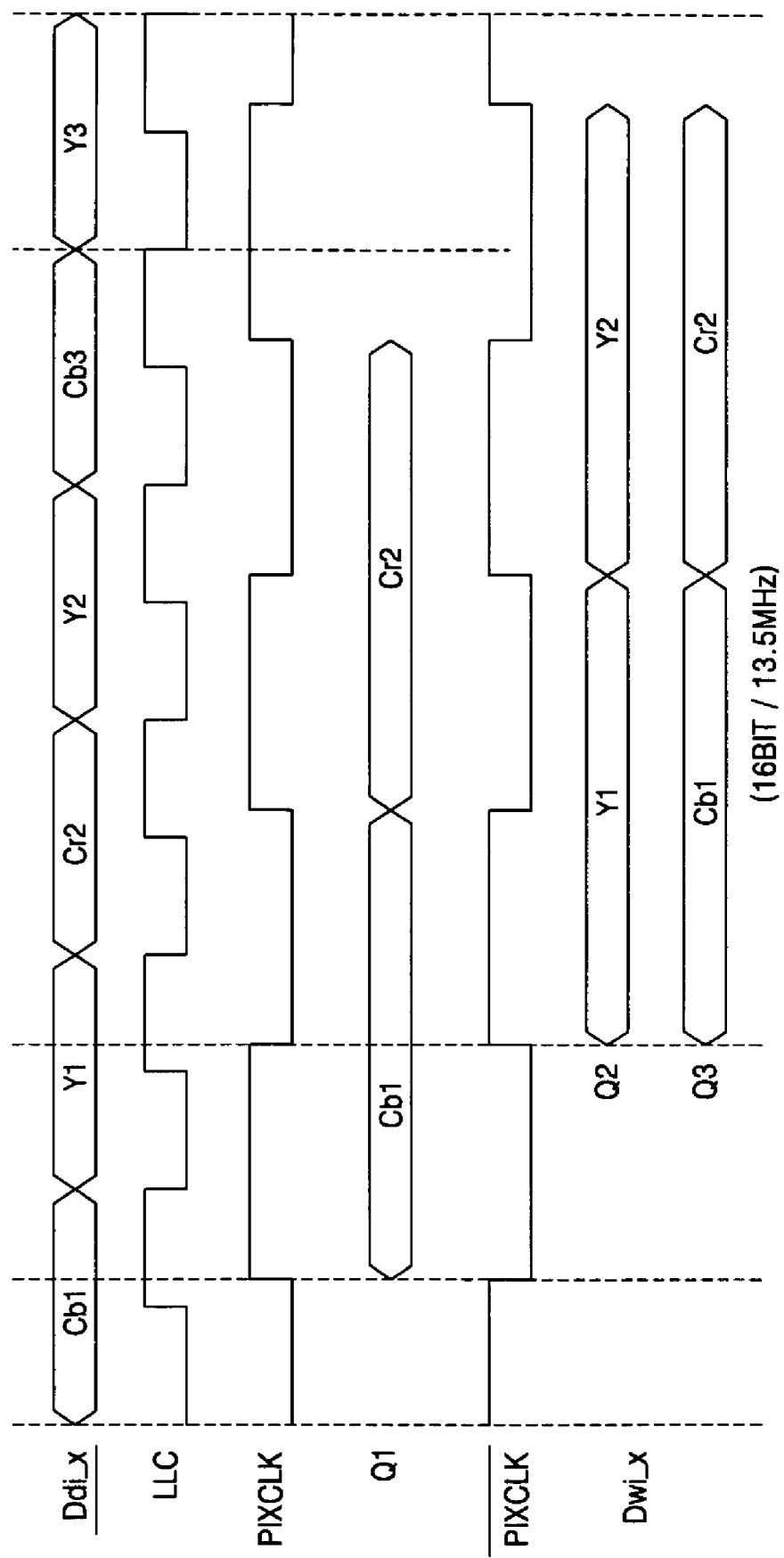

The video decoder 110 outputs digital image information in an YCrCb format and supports both an ITU-R601 format outputting data with a 13.5 MHz 16-bit type and an ITU-R656 format outputting data with a 27 MHz 8-bit type. Therefore, when the 3-D image processing unit 200 is realized with an FPGA, complexity of wiring is often reduced by converting ITU-R656 format signals into ITU-R601 format signals considering a number of FPGA pins. The R656-R601 converter is placed between the video decoder 110 and the 3-D image processing unit 200 or realized in the FPGA when the FPGA is used. FIGS. 14A and 14B illustrate a configuration and function of the R656-R601 converter. As shown in FIG. 14A, the R656-R601 converter can include 3 flip-flop gate arrays, and as shown in FIG. 14B, the R656-R601 converter outputs a 16-bit output signal Dwi_X converted from an 8-bit signal Ddi_X output from the video decoder 110 in response to a clock signal PIXCLK.

Also, unlike related art video decoders 110 that output digital image information in an YCrCb format as described above, since conventional display apparatuses (for example, LCDs) use an RGB signal format, it is necessary to convert YCrCb signals into RGB signals. An YCrCb-to-RGB converter converts a 16-bit 4:2:2 format YCrCb signal into a 24-bit 4:4:4 format YCrCb signal and then converts the 24-bit 4:4:4 format YCrCb signal into a 24-bit RGB signal.

Figure 15A:
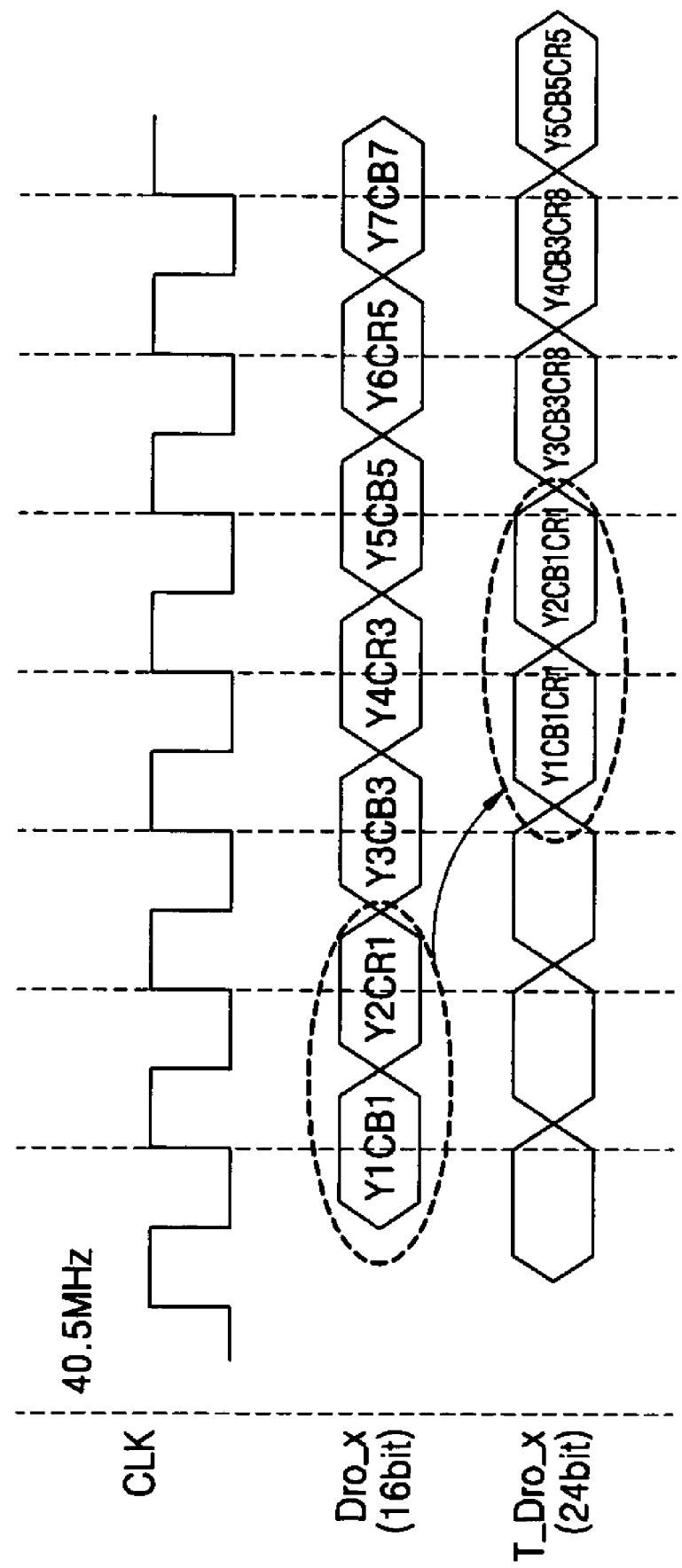
FIG. 15A is a timing diagram illustrating a correlation between a 4:2:2 YCrCb signal and a 4:4:4 YCrCb signal.

FIG. 15A is a timing diagram illustrating a correlation between a 4:2:2 YCrCb signal and a 4:4:4 YCrCb signal. Since Cr and Cb values are set at every second pixel in the 4:2:2 YCrCb signal Dro_X, the Cr and Cb values must be interpolated so that the Cr and Cb values are set at every pixel. That is, the 4:2:2-to-4:4:4 conversion is performed by inserting the Cr and Cb values together in every pixel using a simple zero-order interpolation.

YCrCb-to-RGB converting equations are as follows.

$$R = Y + 1.402 * CR$$

$$G = Y - (0.34414 * CB + 0.71414 * CR)$$

$$B = Y + 1.722 * CB$$

The above equation is realized using an 8-bit multiplier, and equations converted for realizing hardware are as follows.

$$R = Y + CR + \{CR<<6 + CR<<5 + CR<<3 - CR\} >> 8$$

$$G = Y - \{CB<<6 + CB<<4 + CB<<3 + CR<<7 + CR<<6 - CR<<3 - CR\} >> 8$$

$$B = Y + CB + \{CB<<7 + CB<<6 + CB<<2 + CB<<1\} >> 8$$

Figure 15B:
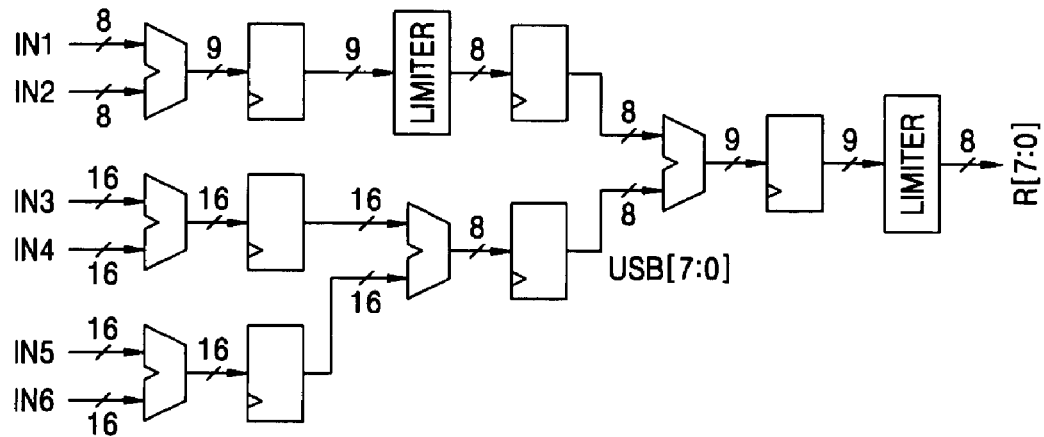
FIG. 15B illustrates a hardware configuration of an RGB converter.
Figure 15B:
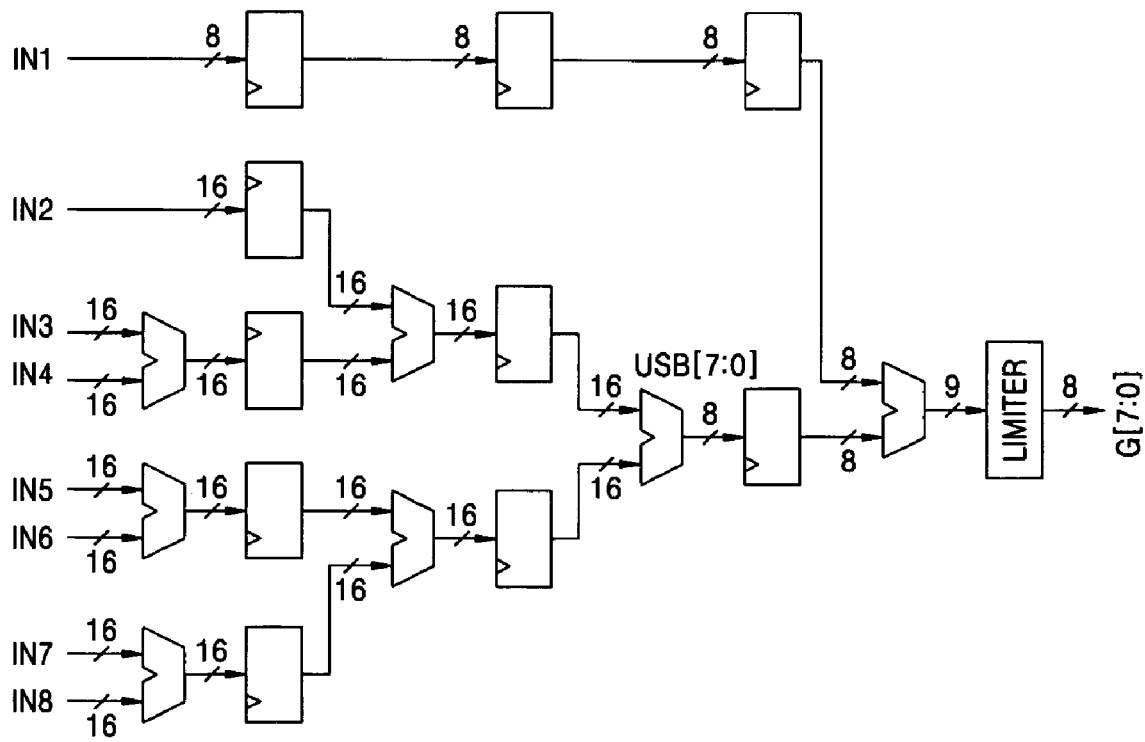

According to a double-structure, a hardware configuration is divided into TYPE I and TYPE II, and R and B/G are assigned to the TYPE I and TYPE II, respectively. FIG. 15B shows hardware configurations of an RGB converter according to the converted Equations.

As described above, according to embodiments of the present invention, a multi-visual-point image interface apparatus using a space-division method of reconstructing multi-visual-point image signals into image signals suited to a 3-D image display apparatus is realized. Accordingly, hardware infrastructure preparing for 3-D image technology realization such as a realtime 3-D TV is provided.

Also, since an interface apparatus capable of being applied to a plurality of multi-visual-point modes without changing a hardware configuration is provided, the interface apparatus is used as an interface unit for a 3-D display apparatus regardless of a space-division mode.

While this invention has been particularly shown and described with reference to exemplary embodiments thereof, it will be understood by those skilled in the art that various changes in form and details may be made therein without departing from the spirit and scope of the invention as defined by the appended claims. The embodiments set forth herein should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A 3-dimensional (3-D) multi-visual-point image signal processing apparatus comprising:
    a video decoder converting an analog image signal received from an image source arranged in m*n space-division mode into a digital image signal;
    a 3-D image processing unit performing 3-D image processing of the digital image signal and generating an output signal suited to a 3-D image display apparatus,
    wherein the 3-D image processing unit comprises a space division mode converter which performs digital image signal processing of image signals in a plurality of space-division modes with a hardware configuration of a predetermined space-division mode,
    wherein the space division mode converter converts the digital image signal from a first space-division mode to a second space-divisional mode;
    a memory which stores the digital image signal; and
    a controller which generates a memory-write-address and a memory-read-address of the memory and controlling write/read order of the digital image signal for scaling and vertical/horizontal multiplexing.

2. The apparatus of claim 1, wherein the 3-dimensional image processing unit comprises:
    a scan converter de-interlacing the digital image signal received from the video decoder from an interlaced signal to a progressive scanning signal;
    a vertical scaler scaling the converted progressive scanning signal in the vertical direction by a predetermined multiple;
    a vertical multiplexer multiplexing the scaled digital image signal in a row direction; and
    a horizontal multiplexer multiplexing the scaled digital image signal in a column direction.

3. The apparatus of claim 2, wherein the space-division mode is a 4*4, 4*2, 4*1, 8*2, 8*1, 2*2, or 2*1 mode.

4. The apparatus of claim 2, wherein the space division mode converter comprises an 8_X space division mode converter converting input image signals in an 8*X space-division mode into image signals in a 4*X space-division mode.

5. The apparatus of claim 4, wherein the 8*X space-division mode is an 8*1 mode or an 8*2 mode, the video decoder inputs image signals received from image sources not in a 4*4 arrangement corresponding to image signals received from image sources in the 4*4 arrangement, and the 8_X space division mode converter performing scaling, vertical multiplexing, and horizontal multiplexing of the input image signals in the 8*1 mode or 8*2 mode like in the 4*4 mode.

6. The apparatus of claim 5, wherein the 8_X space division mode converter comprises a data selector which selects the image signals received from the image sources not in the 4*4 arrangement according to a user mode select signal and an 8_X select clock signal at every second clock pulse when the image signals are received from the image sources in the 4*4 arrangement.

7. The apparatus of claim 2, wherein the space division mode converter further comprises a signal router which routes signals of input terminals in which signals input to the 3-D image processing unit exist, to input terminals in which no signals input to the 3-D image processing unit exist, wherein the signal router routes the signals when the number of image signals of the space-division mode is less than 16 in a case of a 8*1, 4*2, 4*1, 2*2, or 2*1 mode.

8. The apparatus of claim 2, further comprising a 2_X mode image signal distributor which produces image signals received from the image sources and which outputs the produced signals to input terminals of the video decoders to which no image signals are input from the image sources when the space-division mode is a 2*1 or 2*2 mode.

9. The apparatus of claim 8, wherein the 2_X mode image signal distributor generates a first image source signal input to first and ninth video decoders and a second image source signal input to fifth and thirteenth video decoders when in the 2*1 mode, and generates a first image source signal of a first row input to first and ninth video decoders, a first image source signal of a second row input to fifth and thirteenth video decoders, a second image source signal of the first row input to second and tenth video decoders, and a second image source signal of the second row input to sixth and fourteenth video decoders when in the 2*2 mode.

10. The apparatus of claim 3, wherein the image sources and the video decoders receive sync signals generated by external sync signal generators, and the sync signals are transmitted using digital buffers with a tree structure.

11. The apparatus of claim 10, wherein the tree structure has 4 upper branches, each upper branch having 4 lower branches, and one digital buffer for sync control is hierarchically connected to each of the upper and lower branches.

12. The apparatus of claim 2, wherein the scan converter performs de-interlacing in a weave mode or a bob mode.

13. The apparatus of claim 2, wherein the vertical scaler performs scaling with a doubling method.

14. The apparatus of claim 2, wherein the video decoder outputs the digital image signals in an ITU-R656 format, and the apparatus further comprises:

an R656-to-R601 converter converting the digital image signals in the ITU-R656 format into digital image signals in an ITU-R601 format.

15. The apparatus of claim 2, wherein a signal output from the video decoder is a 4:2:2 YCrCb signal, and the apparatus further comprises:

an RGB converter converting the 4:2:2 YCrCb signal into a 4:4:4 RGB signal.

16. The apparatus of claim 15, wherein the RGB converter comprises:

a bit converting unit which converts the 4:2:2 YCrCb signal into a 4:4:4 YCrCb signal by doubling a Cr signal and a Cb signal; and a format converting unit which converts the 4:4:4 YCrCb signal into the 4:4:4 RGB signal.

17. A 3-D multi-visual-point image signal processing method comprising:

video decoding an analog image signal from an image source in an m*n space-division mode into a digital image signal; and 3-D image processing of the digital image signal, by a 3-D image processing unit, and generating an output signal suited to a 3-D image display method, wherein the 3-D image processing unit comprises a space division converter which performs digital image signal processing of image signals in a plurality of space-division modes with a hardware configuration of a predetermined space-division mode, wherein the 3-D image processing comprises:

de-interlacing the digital image signal from an interlaced signal to a progressive scanning signal;

converting the progressive scanning signal from a first space-division mode to a second space-division mode;

vertically scaling the converted progressive scanning signal in the vertical direction by a predetermined multiple;

vertically multiplexing the scaled digital image signal in the row direction; and horizontally multiplexing the scaled digital image signal in the column direction.

18. The method of claim 17, wherein the space-division mode is a 4*4, 4*2, 4*1, 8*2, 8*1, 2*2, or 2*1 mode.

19. The method of claim 18, wherein the 3-D image processing further comprises performing digital image signal processing of image signals in each of the space-division modes with a hardware configuration of a 4*4 space-division mode.

20. The method of claim 19, wherein, when the space-division mode is the 8*1 mode or the 8*2 mode, image signals received from image sources not in a 4*4 arrangement are respectively input to the video decoder as image signals received from image sources in the 4*4 arrangement, wherein the converting the space-division modes comprises:

performing scaling, vertical multiplexing, and horizontal multiplexing of the input image signals in the 8*1 mode or 8*2 mode like in the 4*4 mode.

21. The method of claim 20, wherein the converting the 8_X space division mode comprises selecting the image signals received from the image sources not in the 4*4 arrangement according to a user mode select signal and an 8_X select clock signal at every other clock pulse when the image signals are received from the image sources in the 4*4 arrangement.

22. The method of claim 21, wherein the converting the space division mode further comprises routing signals of input terminals in which signals input to the 3-D image processing unit exist to input terminals in which no signals input to the 3-D image processing unit exist when the number of image signals of the space-division mode is less than 16 in a case of a 8*1, 4*2, 4*1, 2*2, or 2*1 mode.

23. The method of claim 22, further comprising producing image signals received from image sources and outputting the produced signals to input terminals of the video decoders to which no image signals are input from the image sources exist when the space-division mode is a 2*1 or 2*2 mode.

24. The method of claim 23, wherein the distributing the 2_X mode image signal comprises:

generating a first image source signal input to first and ninth video decoders and a second image source signal input to fifth and thirteenth video decoders when in the 2*1 mode; and generating a first image source signal of a first row input to first and ninth video decoders, a first image source signal of a second row input to fifth and thirteenth video decoders, a second image source signal of the first row input to second and tenth video decoders, and a second image source signal of the second row input to sixth and fourteenth video decoders when in the 2*2 mode.

25. The method of claim 18, wherein the video decoding comprises:

synchronizing the video decoder with a sync signal generated by a separated external sync signal generator, wherein the sync signal is transferred using digital buffers with a tree structure.

26. The method of claim 25, wherein the tree structure has 4 upper branches, each upper branch having 4 lower branches, and one digital buffer for sync control is hierarchically connected to each of the upper and lower branches.

27. The method of claim 19, wherein the de-interlacing comprises de-interlacing in a weave mode or a bob mode.

28. The method of claim 19, wherein the vertically scaling comprises scaling with a doubling method.

29. The method of claim 19, wherein the video decoding outputs the digital image signals in an ITU-R656 format, and the method further comprises converting the digital image signals in the ITU-R656 format into digital image signals in an ITU-R601 format.

30. The method of claim 19, wherein the video decoding outputs a 4:2:2 YCrCb signal, and the method further comprises converting the 4:2:2 YCrCb signal into a 4:4:4 RGB signal.

31. The method of claim 30, wherein the converting the RGB signal comprises:

converting the 4:2:2 YCrCb signal into a 4:4:4 YCrCb signal by doubling a Cr signal and a Cb signal; and converting the 4:4:4 YCrCb signal into the 4:4:4 RGB signal.

32. A computer-readable medium having recorded thereon instructions comprising HDL codes for realizing the method of claim 17.

33. A field programmable gate array (FPGA) operating with HDL codes realizing the method of claim 17.

34. The apparatus of claim 1, wherein the space division mode converter comprises an 8_X space division mode converter which converts input image signals in an 8*X space-division mode into another space-division mode.

35. The apparatus of claim 34, wherein the 8_X space division mode converter comprises a data selector which selects the image signals received from image sources not in the 4*4 arrangement according to a user mode select signal.

36. The apparatus of claim 35, wherein the data selector selects the image signals received from image sources not in the 4*4 arrangement additionally according to an 8_X select clock signal at every second clock pulse when the image signals are received from the image sources in the 4*4 arrangement.

* * * * *

UNITED STATES PATENT AND TRADEMARK OFFICE
CERTIFICATE OF CORRECTION

PATENT NO.        : 7,668,241 B2                                         Page 1 of 1
APPLICATION NO.   : 10/910809
DATED             : February 23, 2010
INVENTOR(S)       : Sung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1259 days.

Signed and Sealed this

Twenty-eighth Day of December, 2010

David J. Kappos
*Director of the United States Patent and Trademark Office*